(12) United States Patent
Fuisz et al.

(10) Patent No.: US 12,705,635 B2
(45) Date of Patent: Aug. 11, 2026

(54) METHOD AND SYSTEM FOR DETECTION OF MOTIVATION

(71) Applicant: Veriphix, Inc., Washington, DC (US)

(72) Inventors: John Robert Fuisz, Washington, DC (US); Sinead C. O'Sullivan, Chicago, IL (US)

(73) Assignee: Veriphix, Inc., Washington, DC (US)

( * ) Notice: Subject to any disclaimer, the term of this patent is extended or adjusted under 35 U.S.C. 154(b) by 293 days.

(21) Appl. No.: 17/294,974

(22) PCT Filed: Nov. 15, 2019

(86) PCT No.: PCT/US2019/061785
§ 371 (c)(1),
(2) Date: May 18, 2021

(87) PCT Pub. No.: WO2020/106582
PCT Pub. Date: May 28, 2020

(65) Prior Publication Data
US 2022/0092619 A1 Mar. 24, 2022

Related U.S. Application Data

(60) Provisional application No. 62/769,049, filed on Nov. 19, 2018, provisional application No. 62/769,058, filed on Nov. 19, 2018.

(51) Int. Cl.
*G06Q 30/0203* (2023.01)
*G06Q 30/0201* (2023.01)

(52) U.S. Cl.
CPC ..... *G06Q 30/0203* (2013.01); *G06Q 30/0201* (2013.01)

(58) Field of Classification Search
USPC .............................................. 705/7.31, 7.37
See application file for complete search history.

(56) References Cited

U.S. PATENT DOCUMENTS 8,630,893 B2 * 1/2014 Stibel .................... G06Q 10/40 705/7.29
9,747,275 B1 * 8/2017 Barsness ................ H04L 51/52
(Continued)

FOREIGN PATENT DOCUMENTS

JP H10165593 A 6/1998
JP 2002007659 A 1/2002
(Continued)

OTHER PUBLICATIONS

DiFonzo et al., Rumor clustering, consensus, and polarization: Dynamic social impact and self-organization of heresay, 2013, Elsevier, Journal of Experimental Social Psychology (Year: 2013).*
(Continued)

*Primary Examiner* — Allison M Neal
(74) *Attorney, Agent, or Firm* — Potomac Law Group, PLLC

(57) ABSTRACT

A method and a system receive and process multiple streams of input and output a stream of output that generates a user interface based on the input. The user interface includes one or more questions generated in response to the streams of input and is transmitted electronically to a user. The user provides further input to the method and the system through the generated user interface.

15 Claims, 27 Drawing Sheets

(56) References Cited

U.S. PATENT DOCUMENTS

2005/0261953 A1* 11/2005 Malek .................... G06Q 30/02 705/7.32
2007/0239405 A1 10/2007 Behrens et al.
2008/0046317 A1 2/2008 Christianson et al.
2009/0119162 A1 5/2009 Kaplan
2009/0289115 A1 11/2009 Chung et al.
2011/0238461 A1 9/2011 Mulukutla et al.
2013/0097513 A1* 4/2013 Adarraga .............. H04L 65/403 715/736
2013/0304726 A1 11/2013 Sandulescu et al.
2014/0280222 A1 9/2014 Braytenbaum et al.
2015/0089399 A1* 3/2015 Megill ................ H04L 12/1813 715/753
2015/0248476 A1* 9/2015 Weissinger ............. G06F 16/35 707/737
2015/0302315 A1 10/2015 Ahn et al.
2015/0310462 A1* 10/2015 Garcia ............... G06Q 30/0203 705/7.32
2016/0314425 A1* 10/2016 Cunningham ... G06Q 10/06398
2016/0321260 A1* 11/2016 Owens ................ G06F 16/9535
2017/0206612 A1* 7/2017 Benavides ............. G06Q 10/40
2019/0121529 A1* 4/2019 Rosenberg .......... G06F 3/04842
2019/0131000 A1* 5/2019 Fox ........................ G16H 10/20
2020/0065336 A1* 2/2020 Cox .................... G06F 16/9536
2020/0286108 A1* 9/2020 Stepp ................. G06Q 30/0204
2021/0326714 A1* 10/2021 Li ..................... G06F 16/24573

FOREIGN PATENT DOCUMENTS

JP 2003289300 A 10/2003
JP 2011248436 A 12/2011
JP 2014132475 B 7/2014
KR 20160056255 A 5/2016

OTHER PUBLICATIONS

DiFonzo et al., Rumor Clustering, Consensus and Polarization: Dynamic Social Impact and Social Impact and Self-Organization of Heresay, 2013, Elsevier, Journal of Experimental Social Psychology (Year: 2013).*

Jiang et al., Linguistic Signals under Misinformation and Fact Checking, ACM on Human-Computer Interaction, vol. 2 (Year: 2018).*

Extended European Search Report dated Jul. 8, 2022 for European Patent Application No. 19887770.6.

Author unknown, "Aggregative Contingent Estimation (ACE)", accessed online https://www.iarpa.gov/index.php/research-programs/ace on Nov. 13, 2019.

Author Unknown, "Global Trends: Paradox of Progress", National Intelligence Council, NIC 2017-001, Jan. 2017.

George Mason University Media Advisory project summary Nov. 2, 2018.

International Search Report and Written Opinion dated Apr. 16, 2020 for International Patent Application No. PCT/US2019/061785.

Phillips et al., "Lies, Damned Lies, and Surveys", J Grad Med Educ. Dec. 2017; 9(6): 677-679.

Ryssdal, "Goldfish have longer attention spans than Americans, and the publishing industry knows it", published Feb. 11, 2014, accessed online: https://internet.psych.wisc.edu/wp-content/uploads/532-Master/532-UnitPages/Unit-09/Attention_Goldfish_Abbreviated.pdf.

Schwartz, "Claim Construction Reversal Rates I—Overall Reversal Rates", Patentlyo, Feb. 27, 2008, accessed online: https://patentlyo.com/patent/2008/02/claim-construct-4.html.

Stavrova, "Social Perception of Forecasters: People See Forecasts of Future Outcomes as Cues to Forecasters' Desires, Attitudes, and Identity", Social Psychological and Personality Science I-9, Jun. 2018, pp. 1-9, The Authors.

Welcome to Good Judgment® Open, accessed online https://www.gjopen.com/ on Nov. 13, 2019.

Wikipedia article, "Default mode network", Accessed online: https://en.wikipedia.org/wiki/Default_mode_network#Function on Nov. 13, 2019.

Zappone, "Russia's influence campaigns may be more sophisticated than we thought", The Canberra Times, Dec. 19, 2018, 8 pages.

Office Action (First) mailed Sep. 26, 2023 for Japanese Patent Application No. 2021-550678.

Office Action (First) mailed Nov. 26, 2024 for Japanese Patent Application No. 2024-066631.

* cited by examiner

Secondary Detection Programs

Module A → Receive and Track Repetition of Issues and users in Real-Time Monitoring.

Module B → Export for Repetition (Same Day Re Tweets) of Catalyst Issue.

| Items | | Data |
|---|---|---|
| Platform<br>Question<br>User Tracking #<br>Forecast<br>Comments<br>Interface Type<br>Consensus Data Shown<br>Consensus Data Accessed<br>News Data Shown<br>News Data Accessed<br>Other User Comment Data Shown<br>Order of Interaction | | |
| Age Demographic | 12-17<br>18-24<br>25-34<br>35-44<br>45-54<br>55-64<br>65+ | |

METHOD AND SYSTEM FOR DETECTION OF MOTIVATION

PRIORITY

This current application is a U.S. national stage filing under 35 U.S.C. § 371 of International Application No. PCT/US2019/061785, filed Nov. 15, 2019, which claims priority to U.S. Provision Patent Application Nos. 62/769,049 and 62/769,058 both filed on Nov. 19, 2018, each of which are incorporated herein by reference in their entireties

FIELD OF THE INVENTION

The instant invention relates to a method and system for extracting motivation, which can then be used for threat detection, online media influence, commercial marketing or advertising purposes.

Background of the Invention

The Internet has changed the way people interact. That change has had a profound effect on how we buy and sell goods as well as communicate with each other. See https://www.dni.gov/files/images/globalTrends/documents/GT-Full-Report.pdf, at 200. People are spending more time focusing on themselves and are generally less aware of their surroundings. As people become inwardly focused, confirmation bias is becoming a dominating factor in decision making and news selection as people look for reasons to justify their existing bias. That has led to a form of tribalism. After seeking out people like ourselves, confirmation bias and ever decreasing attention spans lock users in increasingly self-centered patterns. The Internet has created generations use to personalized everything.

Understanding individuals and these smaller tribal groups is complicated. Focus groups and polling are not reliable. See Phillips and Artino, Lies, Damned Lies and Surveys, J-Grad J Grad Med Educ.2017 December; 9 (6): 677-679. (www.ncbi.nlm.nih.gov/pmc/articles/PMC5734316/) Or, as explained by Beau Lotto in his book Deviate: The Science of Seeing Differently, (2018), focus groups are not effective in dynamic (non-stable) environment because participants answer questions based on "who they would like to be," as opposed to "who they are."

Marketing companies have attempted to address this user hyper-focus through the use of psychometric profiles that track an individual across multiple platforms. Data is collect across platforms. Individual behavior is captured (e.g. web sites visited) and profiles of the individual are created to identify motivational insights. Those insights are then embedded in the user's feed as a form of targeted advertising. Profiling assumes that (i) users will repeat past patterns and (ii) even though people are treated as individuals that there will be some lessons that apply to others. Looking for past correlated data is the basis of most artificial intelligent or data mining products.

Not only do those systems ingrain bias, but they require vast sums of personal data. There are unintended consequences of this data collection and personalization. After a user searches for bicycles, the user is then bombarded with advertisements for bicycles. Seeing a unified data set and an advertisement triggered by a visit to a sex page in an advertisement on a news web page can prove disconcerting. The EU General Data Protection Regulations (GDPR) and California's CCPA are changing the rules on what companies can or can't sue. When individuals limit the use of their personal data, psychometric profiling fails.

Thus, there is a need for a method and system that identifies user bias of hyper-focused individuals or tribes while maintaining anonymity. Once identified, that bias can then be used to either preform threat detection or as the basis for a marketing message. The current method and system can further be used to solve the problem of online social manipulation such as that seen during the 2016 and 2018 U.S. elections by advancing a system and method that disrupts the manipulation process such that the user still receives their favored news sources but when manipulation is detected the system slows down the pace of the news. This allows the recipients to review the news in a more objective state of mind and The current invention posits that the cause of the issue relates at least in part to the Default Mode Network (DMN). The DMN has been defined as:

> The default mode network is most commonly shown to be active when a person is not focused on the outside world and the brain is at wakeful rest, such as during daydreaming and mind-wandering. But it is also active when the individual is thinking about others, thinking about themselves, remembering the past, and planning for the future. The network activates "by default" when a person is not involved in a task. Though the DMN was originally noticed to be deactivated in certain goal-oriented tasks and is sometimes referred to as the task-negative network, it can be active in other goal-oriented tasks such as social working memory or autobiographical tasks. The DMN has been shown to be negatively correlated with other networks in the brain such as attention networks.
>
> The default mode network has shown to deactivate during external goal-oriented tasks such as visual attention or cognitive working memory tasks, thus leading some researchers to label the network as the task-negative network. en.wikipedia.org/wiki/Default mode network #Function (Aug. 27, 2018). When an individual thinks about the individual, as opposed to the outside world, the individual is in a DMN dominant state. Reading pushes an individual into a DNM dominant state and results in the user seeing the world through their eyes and ignore their larger role in society. The Internet has exasperated this impact as it is predominantly reading.

In theory, the isolation brought upon by a predominant DMN state should create an isolation that the brain finds uncomfortable after a prolonged period of time. The current invention posits that people compensate for the isolation by finding people that are like them on the Internet. See Derek Thompson, Hit Makers: the Science of Popularity in the Age of Distraction (Feb. 7, 2017). The cognitive dissonance acts as a feedback loop. As people's personalities become inward facing, confirmation bias becomes a larger part of their existence, which in turn makes the individuals more inward facing. Confirmation bias becomes a never-ending loop, which is how fake and real news become intermixed and indistinguishable.

In this predominant DMN state, the user consumes, favors and re-posts information that confirms a user's internal bias without thinking. User's rush to express an opinion and join the group when without the Internet nobody honestly would care what your opinion was and whether you personally feel distraught at the passing of Aretha Franklin. Speed of posting becomes almost automatic as best can be seen when an individual passes and user's rush to either break the story (by re-posting) or express their regrets on-line (to others) as opposed to the bereaved. This a "look at me" phenomena.

The current invention comprises three parts, data collection, data processing and user interaction. The data collection tool, takes panels of individuals in an complete or semi-complete anonymous environment. The same panel answers the same questions, preferably in sets of ten questions, each week during a prescribed 24 or 48 hour period. The panels operate for several weeks (e.g. 4 to 6). The data processing tool computes the weekly question consensus, then identifies a preferred answer zone (e.g. consensus +/−5% to 20%). The system analyzes the users that appear in the preferred answer zone the most in a given week and identifies them as power users. Following which, the system collects and compares the answers from the power users. In general, only the answers from the top 3-7 power users are needed to identify a common theme appearing in the comments. That theme is considered a catalyst issue. In a subsequent week, the catalyst issue can be presented to a split group for testing. The impact of the catalyst issue on the weekly emotion change is considered the Implicit Delta and used to rank catalysts issues for their effectiveness across the larger consumer base. Once identified the catalyst issues can also be backward testing to identify past incidence of abnormal use of the catalyst issue in an area compared to the subsequent sales activity. Finally, the information is presented to the consumer in a dashboard that allows for end users to quickly implement the information in their marketing platforms.

When the tool is used to counter foreign manipulation of social media, the catalyst issues are monitored for abnormal use and upon detection of potential manipulation, individual news feeds are slowed down thus depriving the target of instant gratification associated with the receipt of confirmation bias. This slow down allows for user generated interrupting events (breaks in the process self-initiated by a user) that counter-act and lessen the impact of attempted manipulation. Removing the individual from an automated and unthinking response is thought to lessen the number and frequency of re-posting (and re-affirming) the manipulation event.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements, and wherein:

FIG. 11 is an exemplary schematic of a system database format;

DETAILED DESCRIPTION

The current invention recognizes the unique role that group dynamics have in extraction of motivational insights. In order to explain the system, it is necessary to deviate from the topic and understand group forecasting.

A. Hardware

Figures 1, 2:
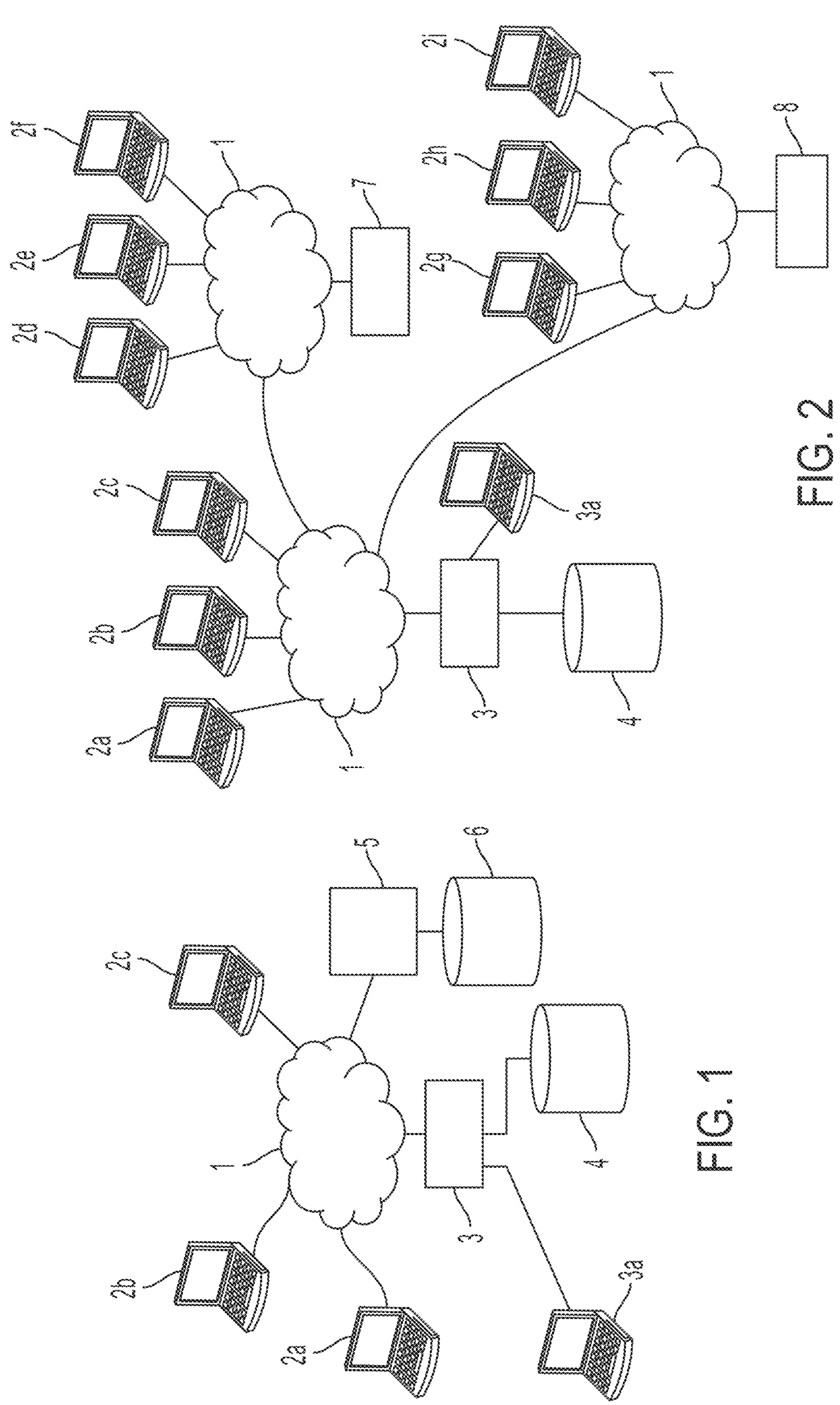
FIG. 1 is a schematic example of a single host system.
FIG. 2 is a schematic example of a distributed system.

In some embodiments, the techniques disclosed herein are implemented on one or more computing devices. For example, FIG. 1 is a block diagram that illustrates user computing devices 2*a*, 2*b*, 2*c*, data supplier computing device 5, with database 6, and host computing device 3 and associated database 4. As shown in FIG. 2, multiple host servers, 7 and 8, can be used and included in the hardware configuration.

The computing devices generally include a bus or other communication mechanism for communicating information, and a hardware processor coupled with bus for processing information. Hardware processor may be, for example, a general purpose microprocessor or a system on a chip (SoC).

Computing devices can also include a main memory, such as a random access memory (RAM) or other dynamic storage device, coupled to bus for storing information and instructions to be executed by processor. Main memory also may be used for storing temporary variables or other intermediate information during execution of instructions to be executed by processor. Such instructions, when stored in non-transitory storage media accessible to processor, render computing device into a special-purpose machine that is customized to perform the operations specified in the instructions.

Computing devices can further include a read only memory (ROM) or other static storage device coupled to bus for storing static information and instructions for processor.

A storage device 4, such as a magnetic disk, optical disk, or solid-state drive is provided and coupled to bus for storing information and instructions.

Computing device may be coupled via bus to a display 3*a*, such as a liquid crystal display (LCD) or other electronic visual display, for displaying information to a computer user. Display 3*a* may also be a touch-sensitive display for communicating touch gesture (e.g., finger or stylus) input to processor. An input device 3*a*, including alphanumeric and other keys, is coupled to bus for communicating information and command selections to processor. Another type of user input device is cursor control, such as a mouse, a trackball, or cursor direction keys for communicating direction information and command selections to processor and for controlling cursor movement on display 3*a*. This input device typically has two degrees of freedom in two axes, a first axis (e.g., x) and a second axis (e.g., y), that allows the device to specify positions in a plane.

The host computing device 3 may implement the techniques described herein using customized hard-wired logic, one or more application-specific integrated circuits (ASICs), one or more field-programmable gate arrays (FPGAs), firmware, or program logic which, in combination with the computing device, causes or programs computing device to be a special-purpose machine. According to some embodiments, the techniques herein are performed by computing device in response to processor executing one or more sequences of one or more instructions contained in main memory. Such instructions may be read into main memory from another storage medium, such as storage device. Execution of the sequences of instructions contained in main memory causes processor to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device. Volatile media includes dynamic memory, such as main memory. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus. Transmission media can also take the form of acoustic or light waves, such as those generated during radio-wave and infra-red data communications. Various forms of media may be involved in carrying one or more sequences of one or more instructions to processor for execution. For example, the instructions may initially be carried on a magnetic disk or solid-state drive of a remote computer. The remote computer can load the instructions into its dynamic memory and send the instructions over a telephone line using a modem. A modem local to computing device can receive the data on the telephone line and use an infra-red transmitter to convert the data to an infra-red signal. An infrared detector can receive the data carried in the infrared signal and appropriate circuitry can place the data on bus. Bus carries the data to main memory, from which processor retrieves and executes the instructions. The instructions received by main memory may optionally be stored on storage device either before or after execution by processor.

Host computing device 3 also includes a communication interface coupled to bus. Communication interface provides a two-way data communication coupling to a network link that is connected to a local network 1. For example, communication interface may be an integrated services digital network (ISDN) card, cable modem, satellite modem, or a modem to provide a data communication connection to a corresponding type of telephone line. As another example, communication interface may be a local area network (LAN) card to provide a data communication connection to a compatible LAN. Wireless links may also be implemented. In any such implementation, communication interface sends and receives electrical, electromagnetic or optical signals that carry digital data streams representing various types of information.

Network link typically provides data communication through one or more networks to other data devices. For example, network link may provide a connection through local network to a host computer or to data equipment operated by an Internet Service Provider (ISP). ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface, which carry the digital data to and from computing device, are example forms of transmission media.

The computing devices can send messages and receive data, including program code, through the network(s), network link and communication interface. In the Internet example, a server might transmit a requested code for an application program through Internet, ISP, local network and communication interface. The received code may be executed by processor as it is received, and/or stored in storage device, or other non-volatile storage for later execution.

A software system is typically provided for controlling the operation of the host computing device 3. The software system, which is usually stored in main memory and on fixed storage (e.g., hard disk), includes a kernel or operating system (OS) which manages low-level aspects of computer operation, including managing execution of processes, memory allocation, file and network input and output (I/O), and device I/O. The OS can be provided by a conventional operating system such as, for example, MICROSOFT WINDOWS, SUN SOLARIS, or LINUX.

One or more application(s), such as client software or "programs" or set of processor-executable instructions, may also be provided for execution by computer. The application (s) may be "loaded" into main memory from storage 4 or may be downloaded from a network location (e.g., an Internet web server). A graphical user interface (GUI) is typically provided for receiving user commands and data in a graphical (e.g., "point-and-click" or "touch gesture") fashion. These inputs, in turn, may be acted upon by the computing device in accordance with instructions from the OS and/or application(s). The graphical user interface also serves to display the results of operation from the OS and application(s).

B. Gamified Forecasting to Extract Emotion

One popular method of group forecasting is the Delphi method. In that system a panel of experts is used and responds to a questionnaire in two or more rounds. After each round, a facilitator provides anonymized summaries of the forecasts from the previous round. The process is stopped after a predefined stop criterion (e.g. number of rounds, achievement of consensus, stability of results) and the mean or median scores of the final rounds determine the results.

On the other end of the spectrum are prediction markets. These are generally exchange traded markets that are created for the purpose of trading on the outcome of an event. The market price is essentially converted into a probability of the event occurring. Prediction markets can give insight into a user's expectation at a given point in time but does not explain why or under what circumstances the expectation will change.

Lying in between these two types is aggregate consensus forecasting. The Intelligence Advanced Research Projects Activity (IARPA) initiated the Aggregate Contingent Estimation (ACE) program. ACE was subsequently embodied in platforms such as GodJudgmentOpen (www.gjopen), Hypermind (www.hypermind.com) and a similar system was used by Metaculus (www.metaculus.com). The theory of ACE is that by combining a group of biased people their individual biases will cancel out, leaving a pure forecast. www.iarpa.gov/index.php/research-programs/ace. The forecast defines the groups collective expectation for the given event. These systems define forecast accuracy using a Brier score. To compute a Brier scores the forecast is converted to a decimal and the following formula is used:

$(1-\text{prediction})^2+(0-(1-\text{prediction})^2$.

For example if an event occurs and there was a 75% forecast that an event will occur, the Bier score is $(1-0.75)^2+(0-0.25)^2=0.125$. A 50% forecast will result in Brier score of 0.5. Accuracy scores are comparisons of the consensus with the user's forecast.

Whether or not the forecasts are ultimately accurate requires a huge amount of data and even then whether the accuracy of the underlying forecast is largely irrelevant. Did it matter that the probability of the hurricane hitting Miami was 80% or 83%? The current invention thus does not use forecasts to predict the likelihood of an event. Rather the current invention treats forecasts as expression of emotion, like bets, and uses the relative change of a forecast at a preset time, by the same group of people of the same issue as a way to monitor change in emotion. The current invention is not concerned with whether the correct forecast was 80% or 83% but how that forecast developed and changed each week.

The present invention posits that forecasts, whether dichotomous or polychotomous, define human expectation. For example, will Hurricane X hit Miami? The possible answers are Yes, No or I don't know. Translating that to percentages, Yes is 51% to 100%, I don't know is 50% and No is 0% to 49%. Conventionally, systems will differentiate between a prediction and then a confidence level in the prediction. For example, a 80% prediction that the hurricane will hit but with an 80% confidence level. The average person is unable to determine if an 80% forecast with an 80% confidence level is equivalent or not to a 64% forecast. The current invention ignores this dichotomy and posits that the individual percentage (e.g. 60% vs 80%) defines a level of acceptable behavior for a group. The hurricane could still hit regardless of whether the percentage is 60% or 80%. What changes is how individuals act in response to the prediction. Evacuations may be socially acceptable at 80% but not 60%. Repeated overestimation by a forecasting entity (e.g. weather channel) results in people discounting the forecast and changing the level of socially acceptable behavior.

The current invention can calibrate the detection of emotion to states where humans are more likely to provide accurate input. In general forecasting assumes a linear relationship in how humans perceive risk. Professional gamblers are generally seen as engaging in a highly risk adverse profession. Gambling of a company's value is bad and would likely give rise to liability. Professional gambles win of 53-54% of the time and sometimes as high as 55%. That may be expected, but what is not expected is when people tip from irresponsible behavior to responsible. Because this is a patent application, looking at the federal judiciary statistics for reversal of patent claim constructions, over an 11 year period district courts were correct on appealed claim construction 61.8% of the time. patentlyo-.com/patent/2008/02/claim-construct-4.html. This study found that at least one term was wrong 38.2% of the time. 70% of the constructions were correct with the errors with 30% being vacated or reversed. Sufficient certainty to base an entire business and to be a good corporate citizen is achieved by being correct 61.8% of the time. Looking at these numbers, the difference between what is generally seen as a high risk profession (55%) and a solid trustworthy system (70%), the tipping point lies in the 15% difference between 55% and 70%. Forecasts in excess of 70% are likely to represent a smaller shift in acceptable human behavior as compared to the 55% to 70% range. Thus, forecasts that fall between 30% and 70% are more likely to accurately reflect changes in group behavior. This range can be further refined to 30% to 45% and 55% to 70%.

Next, there is a difference between a forecast and a prediction that gets ignored in group forecasting and distorts the results. Existing group forecasting sites treat all forecasts and predictions equally and generally compute the consensus using the most recent 40% of forecasts (See www.gjopen.com). The use of a percentage of votes creates volatility at the start of the process and as the number of forecasts and predictions rise each subsequent forecasts has a smaller impact on the consensus. The number and timing of the forecasts and predictions distorts the calculation. The decrease in volatility has a secondary effect. Human brains are less susceptible to seeing small gradual change. Thus, a hypothetical forecast that creeps up slowly from 63% to 67% to 71% does not impact people the same way that the hypothetical data if not weighted could perhaps go from 63% to 64% to 74%. By decreasing the consensus sensitivity through intentional or unintentional weighting of data, the consensus can miss change that translate to changed human behavior patters.

In the current system, a prediction is a one time forecast that is not changed and is locked in time regardless of the emergence of new information. A bet is a form of prediction. The odds of the bets are determined and locked in place at the time the bet is placed. By ignoring new factors, a prediction can also ignore the potential for black swan events and be expressed as 0% or 100%. Forecasts, however, are iterative and updated or confirmed, based on new information. They also tend to account for the occurrence of unforeseen events. A forecast does not need to change over time but does in essence get reconfirmed. Because all forecasts start as a single event, they are temporarily predictions until such time as they are updated or reconfirmed. The present invention recognizes this discrepancy and provides for a dynamic system that computes and recomputes consensus on a time basis to remove the undesirable impact of predictions on a group forecast. In doing so, a more accurate picture can be obtained of the group behavior and acceptable level of conduct.

In the alternative, the current invention uses weekly consensus per panel per question to represent the weekly emotional state of the panel. The consensus is time dependent on a weekly basis and it is that time dependent consensus that is compared week to week to determine emotion change. If panel members miss a weekly forecast, they can be excluded from subsequent participation for the remainder of the panels time period. Three and six week panels have been used. A four week panel allows two extraction weeks and two test weeks, whereas a 6-week panel allows three extraction weeks and three test weeks. Panel members tend to drop off by 10-20% at the end of a 6 week panel. Thus, a 100-person panel may start at 120 members and decline to 90-100 at the end of the 6 weeks.

Figure 37:
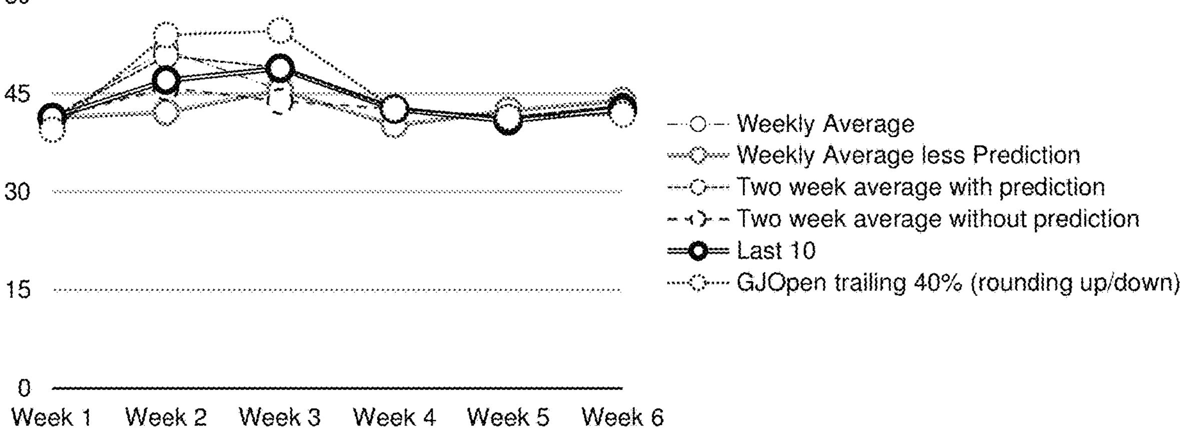
FIG. 37 is a graph illustrating different consensus methods using hypothetical data, according to an embodiment.

Using hypothetical data, the different consensus methods can be compared. The hypothetical data used for this example is illustrated in FIG. 37 and presented in the table below:

Hypothetical Example

| | Week 1 | Week 2 | Week 3 | Week 4 | Week 5 | Week 6 |
|---|---|---|---|---|---|---|
| User 1 | 47 | 50 | 45 | 47 | 48 | 50 |
| User 2 | 41 | no entry | 42 | no entry | 45 | no entry |
| User 3 | 40 | 45 | no entry | 45 | 45 | 47 |
| User 4 | 39 | 36 | no entry | 39 | 40 | 38 |
| User 5 | 40 | no entry | no entry | no entry | no entry | no entry |
| User 6 | no entry | 50 | no entry | 50 | no entry | no entry |
| User 7 | no entry | 30 | 25 | 20 | 22 | 20 |
| User 8 | no entry | no entry | 61 | no entry | no entry | 65 |
| User 9 | no entry | no entry | 55 | no entry | 55 | no entry |
| User 10 | no entry | 100 | no entry | no entry | no entry | no entry |
| Weekly Average | 41.4 | 51.83 | 45.6 | 40.2 | 42.5 | 44 |
| Weekly Average less Prediction | 41.4 | 42.2 | 45.6 | 40.2 | 42.5 | 44 |
| Two week average with prediction | 41.4 | 50.85 | 49 | 42.7 | 41.45 | 43.18 |
| Two week average without prediction | 41.4 | 45.94 | 43.9 | 42.7 | 41.45 | 43.18 |
| Last 10 | 41.4 | 47.09 | 48.9 | 42.7 | 40.9 | 42.7 |
| GJOpen trailing 40% (rounding up/down) | 39.5 | 54 | 54.67 | 42.75 | 41.45 | 41.92 |

In this example, the order of the users is also considered the time of the forecasts. When computing percentage of votes, the number of votes was rounded up or down.

Anchoring is a cognitive bias in which the brain relies to heavily on an initial price of data, which may or may not be, related to the question at hand. Anchoring feedback is ignored in ACE which skews the results. Thus, publishing a current consensus, user profile, accuracy scores, or the like, all bias a user's forecast. If a forecaster is first told that there is an 80% chance the hurricane will hit Miami, the forecaster is more likely to provide a forecast close to 80% as opposed to 20% even if the forecaster's models indicate that 20% is appropriate. Looking at the hypothetical data above, a first time forecast (e.g. prediction) made at week 5 knowing the consensus calculations up to week 4 would be different depending on the consensus calculation that the user was exposed to. If the user only saw the GJOpen model they may be inclined to factor in the steep decline in consensus and make a even lower forecast. If the user was only exposed to the two week average with predictions removed, the relative flat nature of the consensus may direct the user to a more neutral forecast.

Finally, how questions are presented is ignored. This is not correct. A question of "will Hurricane X hit Miami?" is very different from "will Hurricane X not hit Miami?" The present invention rejects this concept and recognizes that the framing of the question impacts the presuppositions and hence the bias involved.

C. Extracting Bias

The system starts with anonymity. Users are more likely to express their opinions when they are anonymous. Personal identifying information is not needed to operate the system.

In general, 100 person panels are used. The panels are seated for a set period of time (e.g. 6 weeks). Because individual participation can drop off, the panels can be over subscribed and end the period under subscribed. Although for the purposes of doing pure catalyst issue extraction, panels as small as 25 can work, the smaller panels do not allow for the subsequent panel splitting and A/B testing. It is preferred that the panel maintain at least a 50 person participating. Attempting to maintain a 100 person average allows for panel testing, increases consensus fidelity.

Each panel is provided with the same question set each week for the period. Question sets can be maintained for multiple panels to monitor a given set of issues for the entire year. In week 2, the panel members are shows their prior week forecast and the group's prior week consensus.

In response to each question, instead of expressing an opinion using certainty (yes/no), individuals are asked for their opinion as a percentage (e.g. 70% chance of an event happening.)

In a preferred embodiment, the users are only allowed to input forecasts to the question sets at the same time each week. 24 and 48 hour windows are preferred. Panel members tend to comprise individuals who answer each week as soon as the system opens and then individuals who respect right before it closes. The longer the window stays open, the greater propensity there is for intervening news to skew the later responses. Preferably the system only allows weekly inputs during the same 24-hour period each week (e.g. every Friday). This provides a consistent time based consensus to compare the weekly emotion change of the group.

The present invention relies on a herd theory, that defines the members of the herd as existing within a predetermined emotional range away from the consensus of the herd. In other words, on a weekly basis if the group consensus on question 1 is 57%, the limits of those who would be seen a conforming with the herd can be defined as those appearing at +/−20% from the consensus, so 37% and 77%. Individuals who had forecasts below 37% or above 77% are seen as to far emotionally away form the herd such that their reasoning would simply be rejected. Individuals who are central to the herd, e.g. +/−5% from consensus, are seen as representing the emotional center and not as expressing opinions that, if amplified, would move the emotional center of the herd. Thus, two ranges are identified +/−5% to 20% as the zones in which reasoning may have been expressed that if amplified will move the larger group. The range can be varied, but testing as shown that 5% lower threshold and a 25% upper threshold to be useful.

After computing the users in the upper and lower zones for each question in a given week, the system identifies the uses who had the most answers in these zones. Those users are referred to as power influencers. The comments from the top power influencers and analyzed for common themes. It is unlikely that two users will provide identical comments, but common themes will appear. These common themes are referred to as catalyst issues, which if amplified to the group as a whole may move the emotional center of the group.

1. Overview Example

By recognizing these and other problems with group forecasting, the systems can be modified and combined with other elements to extract bias. This extracted bias can then be used for marketing (identifying bias and using it for product sales) or threat detection (identifying bias that is being used by others).

The system ideally begins with some level of anonymity. Users have to feel comfortable to forecast questions without the forecasts being attributable to their profile and following around the Internet. Yet, the system has to allow to the same user to log in and make multiple forecast. The present invention proposes a log in system in which the log in host generates a series of random numbers. User's extract a number and check the question to see if the number was previously associated with a response. If so, a second number is selected. If not, the user assigns itself the number as the user's question X tracking number. The self assigned tracking number is then used to organize the forecasts. The host system to aggregate all forecasts and comments associated with the tracking number. Only the user, whether retained locally or encrypted at the host cite, knows the tracking numbers that the user has claimed and used. The anonymity allows users to express themselves without fear of repercussion. This also allows the system to be implemented across States and international borders and comply with differing restrictions on personal user data. Tracking on a question level has additional benefits in that even with anonymity it allows for predictions to be selectively removed and for a more accurate consensus to be determined. Anonymity also reduces anchoring feedback associated with profiles.

Next, preferably multiple questions on a single issue that touch upon (i) an event, (ii) economics of an event, (iiI) personal security surrounding an event, (iv) health and wellbeing surrounding an event, and (v) demographics surrounding an event. Ideally more than one question is asked and the question is phrased in multiple manners to focus and extract the desired bias. For example, the following questions, which all relate to a single event, can be phrased differently to infer different presuppositions and extract selected bias:

(i) Will more than 10,000 people rent electric scooters in San Francisco in the next 3 months?
(ii) Will less than 10,000 people rent electric scooters in San Francisco in the next 3 months?
(iii) How many scooter related injuries will be registered with San Francisco ERs in the next 3 months?
(iv) Will minority use of electric scooters in San Francisco in the next 3 months exceed 40%?

In (i) the presupposition is that achieving 10,000 rentals is a difficult task. In (ii) the presupposition is the opposite, that 10,000 is achievable. Because, having question (i) and (ii) on the same platform will impact the responses, the system is capable fo deploying questions across multiple platforms and then aggregating the data. The forecast consensus for these questions will then define the type of bias that is extracted and how it is used.

For example, if the consensus on question (i) was 70%, this representing a relatively high level of optimism that San Francisco will exceed 10,000 scooter rentals in 3 months, one may assume that the consensus on question (ii) should be 30%. Because of unstated bias, the present invention posits that these questions will not correlate. That divergence will be due in part to unstated bias that is impacting forecasts. The bias that is expressed will be a function of the question and consensus at the time of posting. Hence, the system ideally, but does not mandate, the use of multiple questions on related, or identical topics, to seed for bias extraction.

Catalyst issues are issues expressed by a user that are used to justify a higher or lower forecast compared to the consensus. The forecast-consensus difference (F-C Delta) should not be an extreme (e.g. forecast of 5% when consensus is 75%). Groups will tend to discount and ignore forecasts that represent extremes. F-C Deltas that are +/−50% of the consensus can still be persuasive. Use of the Ackerman bargaining theorem (offers of 65%, 85%, 95% and 100%) can also be used to identify forecasts that are at +/−65% of the current consensus. F-C deltas that are consensus invariant are also plausible and tend to favor human preference for certain differentials. A 19% difference regardless of the consensus can appear persuasive and thus the explanations are captured as catalysts issues.

If the consensus on question (i) was 75% and someone forecasts a 60% chance, this would still be seen as a positive forecast but the 15% differential would be seen as a negative biasing factor. If in this example the user identified filthy streets/homeless encampments as a basis for their forecast, this explanation would be tracked as a negative factor, referred to herein as a catalyst issue.

Catalysts issues taken from forecasts in the 30%-70% range are preferred as they reflect predictions in the range that is more likely to correlate to changes in human behavior.

D. Testing of the Catalyst Issue

After a catalyst issue has been extracted, the next phase is testing.

Active testing is best optimized using a front end application that allows participants to be segmented and then exposed to news feeds in which issues are tested. In an active test, a group is split into a control and test group. In week X, the groups are not show news. In week X+1, the test group is supplied with news, which can take the form of a link to an article embodying the issue being tested. The consensus for the sub-groups is compare from week X to week X+1, the cumulative differential is referred to the Implicit Delta (the % change in emotion that introducing the news created).

$$\text{Implicit Delta}=(\text{Control Consensus Week } X-\text{Control Consensus Week } X+1)-(\text{Test Consensus Week } X-\text{Test Consensus Week } X+1).$$

Movement by the consensus confirms that the issue is tied to an emotion that impacts the consensus in a particular direction. This gives us the loop to tie to the product or issue that we are trying to influence.

In a forward looking passive test, the news or online communities are monitored for occurrences of the issue. If the issue spikes in the news (an increase or decrease from the norm), it should organically have an impact on the consensus. If the consensus subsequently spikes, the issue is a confirmed hot button issue (catalyst issue). A negative impact is a cold button issue. The time period in which to see the subsequent movement depends on a number of factors, such as user engagement and news cycles, but generally appears within 7 days of the detected spike.

In a backward looking passive test, news or online communities are monitored for abnormal occurrence of the issue and compared to subsequent product sales or other event associated with the desired emotional state. This allows for a rough correlation that can be used to have greater confidence in the impact of the catalyst issue.

There is a time dependency of extracted bias and forward and reverse looking passive testing can fail, in part, because the applicable time window for a catalysts issue has changed.

E. Uses for Confirmed Catalysts Issue

After a catalysts issue has been confirmed, there are multiple uses for the information. If the desired result is to move expected human behavior in the confirmed direction, saturation of media with the issue can be effective tool. If the catalyst moves the expectations in the wrong direction, secondary testing can be employed for counter-message optimization.

F. Log in and Tracking Numbers

The current invention includes the option to track user responses to questions by using an anonymous question tracking number. This feature is not limited to use with the present invention and can be used for other purposes. In the context of the present invention, it allows for tracking of forecasts on a question level without the need to collect personal user data. This allows for the deployment of the current invention on multiple systems that may be subject to different legal requirements on the collection and export of personal user data.

Figures 3, 4:
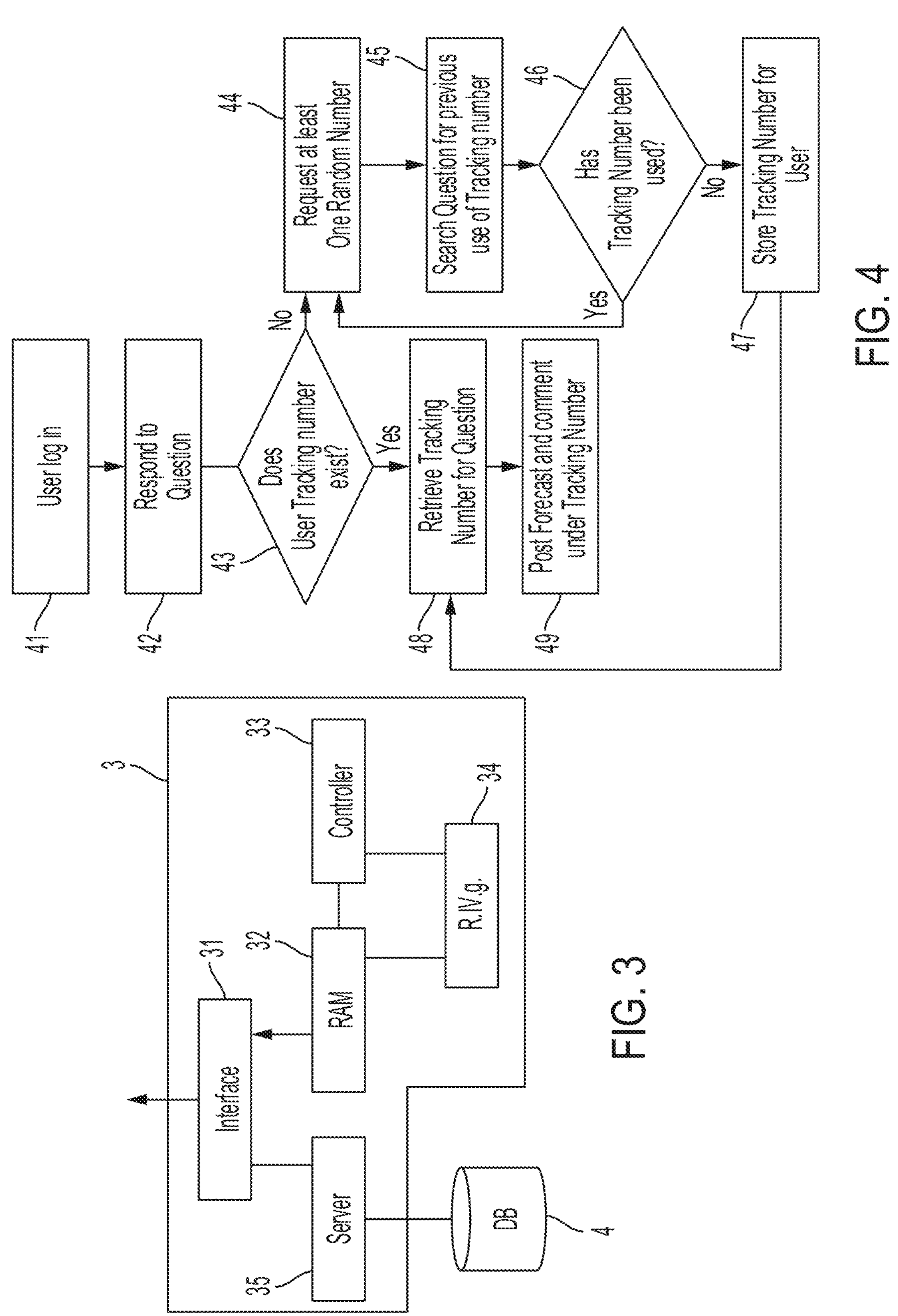
FIG. 3 is a schematic example of an interface with a random number user tracking.
FIG. 4 is an exemplary flow diagram of a random number user tracking module.

As shown in FIG. 3, the host computing device contains an interface 31 that bifurcates requests to the server 35 and database 4, which are associated with the forecasting process, or to RAM 32, controller 33 and Random Number Generator (RNG) 34.

The RNG cycles through random numbers which are held in RAM 32. When a user logs in and requests a number, one or more is transmitted from RAM 32. The controller 33 does not track which user requested numbers or whether a number is duplicate. When the user logs in and attempts to post, the system will determine at that time whether the tracking number is already in use.

The random assignment of numbers also reduces the ability of other forecasters to deduce the order of a forecast or the identity of the forecaster. To the extent that any number is displayed to the user it has the potential to create an anchoring bias and thus, if shown, the random assignment and unification of digits attempts to minimize the impact of the bias. This also helps in the reduction of anchoring and bias associated with following known users.

To facilitate speed and large number of responders, the system can be set up to expand as needed. For example, RNG 34 can be set to generate one digit numbers (0, 1, 2, 3, 4, 5, 6, 7, 8 and 9). Zero is discarded. Controller 33 compares the number of requests for numbers to the numbers of posts on a question and when the number of requests is twice the number of posts, the system can expand. Controller 34 then tells the RNG 34 to expand to two digit numbers. To unify and obscure the order, the existing posts using numbers 1 through 9 have a trailing "0" appended to the end such that all posts have the same number of digits as tracking number. To the extent a posts exists with 3, 6, and 5, those posts would then have their identifier changed to 30, 60 and 50. If the tracking number is not displayed, it will not induce an anchoring bias and obscuring the order is not as important.

Alternate, implementation include appending an alphanumeric, such as "a" during each expansion and then randomly assigning additional digits to pad all tracking numbers while minimizing the potential anchoring bias.

One example of the user log in process when tracking numbers are being used is shown in FIG. 4. Upon user login 41 and attempt to respond to a question 42, the user's system checks its memory to see if there is an existing tracking number for the question 43. If one does not exist, the user's requests one or more random numbers at 44. Upon receipt of one or more random numbers, the user's system alone or in combination with the host system searches the existing posts, or database of used post tracking numbers, for use of the random number 45. If the random number has been used, additional random numbers are requested from 44. If not, then the user stores the number for posting on the question 47. Because multiple users may be in the process of posting at any given time, it may be preferable to collect and check multiple tracking numbers. Prior to allowing a forecast to be posted, the system will check tracking numbers against used numbers to ensure that multiple users do not use the same tracking number. In an alternate embodiment, at 47, the system can store claimed numbers and load them in the search at 45 so that new users are not assigned pulled but not posted tracking numbers.

Figure 5:
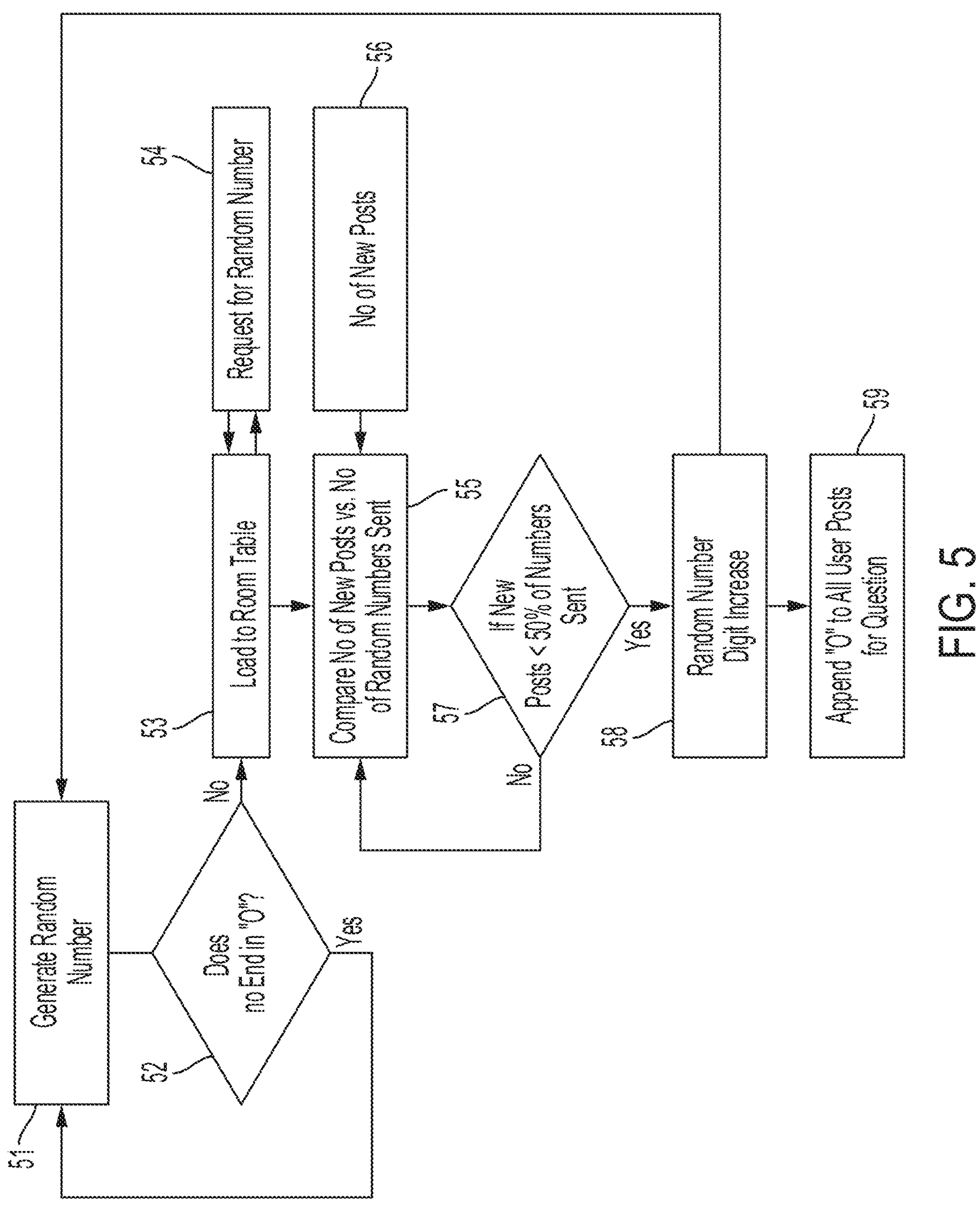
FIG. 5 is an exemplary flow diagram of an expandable random number user tracking module.

An example of the process of expanding the number set is shown in FIG. 5. After generating a number 51, the system checks 52 to see if it ends in a "0". If so the number is discarded and a new number is generated. If not, the number is loaded into table 53 for request and receipt by users 54. The system receives the number or rate of new posts 56 and compares that to the amount of numbers generated 55. If new posts are less than half of the numbers sent to users 57, the assumption is that there is a high rate of rejection and expansion of the number of base is required 58. The system then appends a "0" to the existing posts associated with the question and alters the number of digits that are generated 59.

Figure 6:
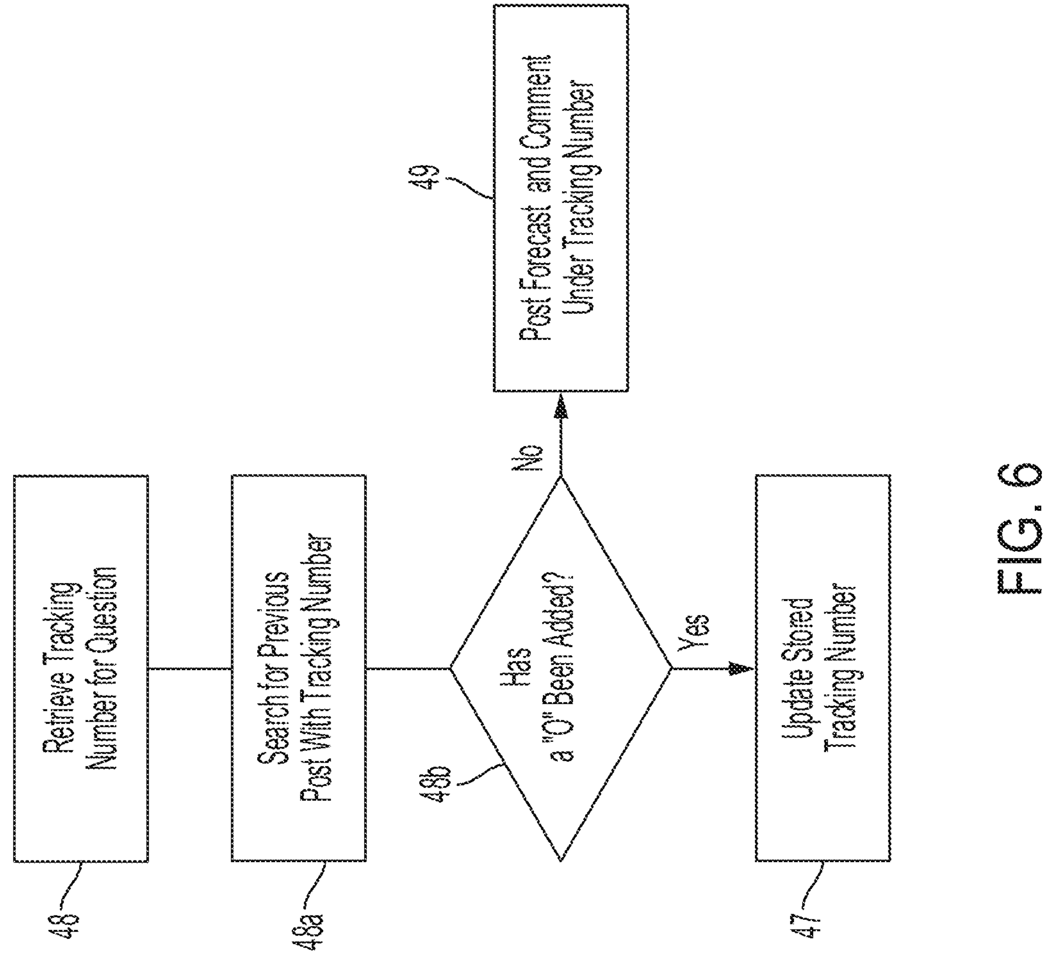
FIG. 6 is an exemplary flow diagram of a user posting using a random number user tracking module.

As shown in FIG. 6, when a user goes to post, the user retrieves the previous tracking number used 48. The user then requests a search of the existing posts to identify the previous posts using the stored tracking number 48*a*. If a "0" has been appended, 48*b*, the user updates the stored number 47. If not, the user posts with the tracking number 49.

To assist with the process, the host system can maintain a database of the tracking numbers and date/time of post that the user systems can access and verify availability of tracking numbers, previous use of a user's tracking number or to identify conflicts of tracking numbers and request separate of the forecasts. If posts with a user's tracking number do not match the user's records on date and time of posts, the user system can alert the host system. Although two users accidentally posting under the same tracking number may match in date and be close in time, there is likely to be a divergence in date/time on the second post. If neither party posts a second forecast, the original forecasts will be marked as predictions and discarded, which will obviate there impact on the system. When a conflict is identified, the host system can append a "b" or other identifier to the suspect duplicate posts which will then trigger the user system attempting to post and learning of the "b" designation to compare posting dates and times with the host, identify common posts for that user and then to request a new tracking number from the user for the identified posts.

The login function also defines the user interface, which will be described below. Different systems 3, 7 and 8 can contain different types of information. The user interface will be defined during at least the first login, which may be platform dependent, question series dependent or user dependent.

In addition or as an alternative to the anonymized process discussed above, the current invention can also be used by assigning users into demographic buckets. To comply with GDPR and possible United States equivalent requirements, the current system can take user data and assign the user to one or more demographic buckets. These buckets may include age, gender, race, household income, home ownership, disabilities, education, employment status, children, location, marital status, car ownership, savings, sexual preferences, purchase history, videos, or social blogs. In this case, age demographics may include buckets for 12-17, 18-24, 25-34, 35-44, 45-54, 55-64 and 65+. If a user logs into the system, creates an account and identifies as a male aged 28, the system would assign the individual to the 25-43 age demographic. The data recorded in 116 would include a notation that the information captured related to someone in the 25-43 age demographic.

Location buckets include regions, which may be cities, states or combination of states. For example, "Northeast" may include CT, MA, ME, NH, NY, RI, and VT.

Income buckets include brackets similar to the age buckets, which can include such known income brackets as: Less than $25,000, $25,000 to $34,999, $35,000 to $49,999, $50,000 to $74,999, $75,000 to $99,999, $100,000 to $149,999, and $150,000 or more.

Education buckets include brackets similar to the age buckets, which can include such known education brackets as: Less than high school, High school graduate (includes equivalency), Some college, no degree, Associate's degree, Bachelor's degree, Ph.D., or Graduate or professional degree.

The present invention is not limited to these specific buckets and breakdowns. The categories in the buckets can be modified to suit the need of the particular inquiry. The present invention can also include self-identified associations. If the front end data collection process is gameified, individuals can be asked for input on questions where a winner is declared and a prize won. If user identify is captured, prizes can be awarded to individuals, for example, for having an accurate forecast. However, to preserve individual anonymity, a user may compete for a prize on behalf of an organization to group, such as a church, sporting team, charity, etc. Those groups are captured and used in a manner to a demographic bucket.

G. Interface

Figure 7A:
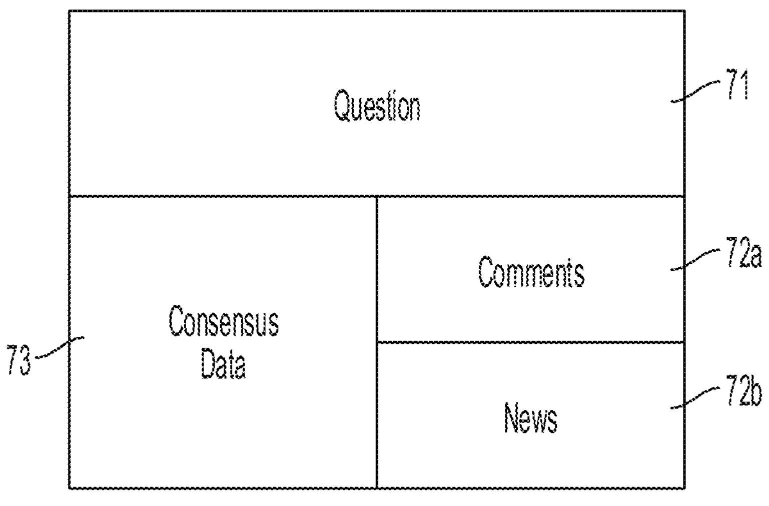
FIG. 7*a* is an exemplary diagram of a basic interface.

The interface on the user's systems, whether be in a browser, stand alone program, phone or tablet are designed to limit the potential for anchoring bias while, appearing anonymous and encouraging forecasts with comments. As shown in FIG. 7*a*, the interface can include the question 71, consensus data 73, comments from other users 72*a* and/or selected news headlines with links 72b. Once a question is presented, the information contained on the interface is captured. Preferably, the order in which the interface was manipulated (e.g. forecast entered, click on story #3, then story #2, enter comments, check consensus data, edit forecast and submit) is also recorded. When a user submits a forecast the interface data is submitted to the host as part of the forecast. The host can then track the interface information without having that data correspond to a known user but rather to an anonymized tracking number.

Figure 7B:
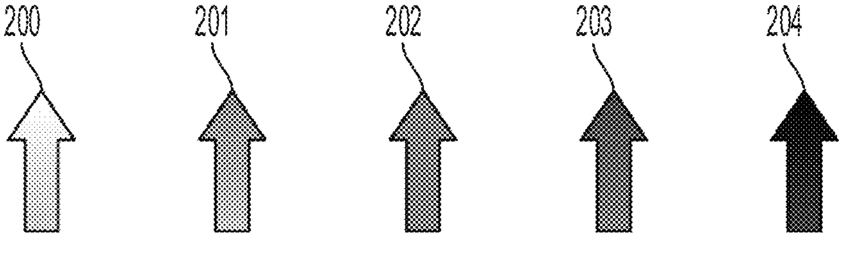
FIG. 7*b* is an exemplary diagram of shaded arrows to denote deviation from consensus.
Figure 7C:
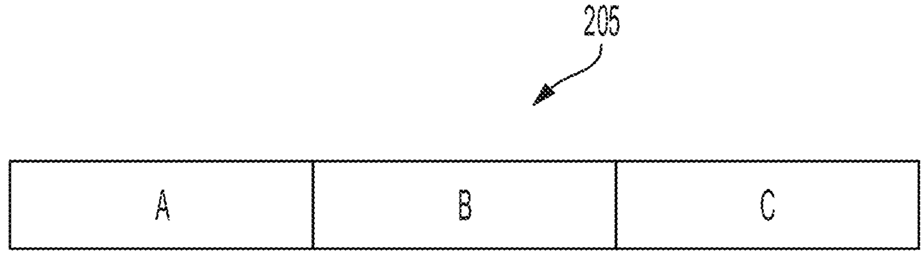
FIG. 7*c* is a schematic of a basic data structure.

Interface data will get captured and transmitted as part of the user/s forecast so that the system 3 has all associated interface data that corresponds to the forecast. To avoid large transmission of data, the interface data can be coded by the user's system and then decoded at the host system. Coding allows the tracking number and forecast/interface data to be transmitted with a de facto base encryption and reduce the data transmission need. As shown in FIG. 7*c*, the data structure 205 sent by the user to the host system can contain a header A, transaction number B and coded interface data C.

The question field 71 will preferably contain the question, which ideally be one in a series of related questions. As noted above, different phrasing on the same question can illicit different biases. It is preferable that apposite pairings (e.g. "will hurricane X hit Miami?" and "will hurricane x not hit Miami?") be made available to the same user. This can be accomplished by pushing the paired questions to different systems, such as 7 or 8 in FIG. 2. Alternately, users after log in can be assigned to different question sets in that contain one of a give paired set of questions. Thus, some that log in will see "will hurricane X hit Miami?" and another set will see "will hurricane X not hit Miami?" Field 71 will also include an answer section to respond with a percentage and for adding comments. The percentage and comments can also be provided in a dropdown menu format to ease entry or limit the entry to certain prescribed options.

The consensus data 73 attempts to provide the user with enough confidence to make an forecast without biasing the user or deterring a forecasts. Existing systems tend to show the user the current consensus estimate or odds. Thus, if the system shows a consensus trending to 20%, a user is unlikely to forecast 80% without second guessing their estimate and attempting to discern why they differ from the consensus to such an extreme. A user in that situation will tend to lower their initial estimate. That in turn artificially lowers the consensus. More importantly by creating doubt the user is less likely to leave a comment expressing their implicit bias. Rather, in consensus data 73 the current system has the ability to use several alternatives that limit the potential anchoring effect.

In one embodiment, the last 20-30 raw scores are shown. Ideally the number of scores is sufficient to prevent the user from being able to estimate a consensus. Use of 20+scores appears sufficiently complex such that mental or manual attempts at determining the mean will be discouraged.

In another, consensus graphs are shown, but the graphs show consensus ranges. These ranges can be derived as discussed herein and include calculations with predictions, without, daily, weekly, two week averages etc.

Comment section 72*a*, like the consensus data 73, is optional, and can include a selection of previous comments on the given question. Rather than show predictions and consensus at the time the comment was made, it is preferable to display whether the comments corresponds to a forecast higher or lower than the consensus at the time it was made. Arrows may be appropriate with coloring to denote the approximate forecast made by the user that posted the comment. As shown in FIG. 7*b*, an arrow 200 may go from white/light blue 201 to all light blue 202, to light blue/dark blue 203 and then all dark blue 204. Green or another neutral color can also be used for the opposite direction. This provides four gradients in which to define the forecast of the posting user without disclosing the actual forecast and biasing the user.

News section 72*b* is also optional and can be used for generic news feeds, issue testing or message testing. News feeds that do appear in the feeds get tracked. The articles and order of presentation are captured. In addition, a base linguistic analysis of the articles is performed to determine possible issues, sentiment analysis and key words.

H. Alternative Questions

The system can be run with a single question but use of more than one related question is preferred. It is preferred to run questions in sets and repeating the same question sets to the same users.

Questions are preferably deployed in sets that go beyond the specific topic of concern. Related questions are preferred including on (i) economic, (ii) social/faith based/religious, (iii) personal security, including crime, (iv) personal welfare and (v) racial of other known biases. In one embodiment questions are packaged in sets that touch upon these issues. For example, a question may include:

(i) Will Company X rent more then 10,000 scooters in San Francisco in the next 3 months?

(ii) Will Company X fail to rent more then 10,000 scooters in San Francisco in the next 3 months?

(iii) Will the San Francisco economy meets its targeted growth of X in the next 3 months?

(iv) Will homeless encampments on San Francisco streets increase in the next 3 months?

(v) Will crime increase in San Francisco in the next 3 months?

(vi) Will pedestrian-scooter accidents increase in San Francisco in the next 3 months?

(vii) Will minority usage of scooters from Company X exceed X % in the next 3 months?

The question sets allow for catalysts issues identified with respect to any question in a set to be tested against the users answering any of the question.

The questions can deployed on a single platform of across multiple platforms. In one embodiment, one or more questions are deployed across web sites that include: (i) social media platforms (e.g. Facebook, Twitter, etc); (ii) forecasting or predicting websites, (iii) betting platforms; (iv) human rights focused platforms; (v) remote desktop deployment and/or (vi) remote deployment via dedicated satellite modem system for use in non-Internet enabled locations.

I. Consensus calculation

The consensus calculation is used in multiple ways by the current invention.

Consensus data ties to a question, a date/time, a forecast, interface data and ultimately a user. In the preferred method, users answer the same questions on the same platform at the same time each week.

The present invention contemplates that the consensus estimate will be computed in multiple manners to optimize bias extraction and in testing catalyst issues. Methods can $$C = \sum_{n=1}^{x} \frac{F_n + F_{n+1} + \ldots + F_x}{x}$$

include, a traditional mean average,

If the time window for the forecasts input is extended and the number of users is sufficiently high (e.g. greater than 50) a tradition 40% of all forecasts (y=0.4x) can be used to isolate the $$C = \sum_{n=1}^{x} \frac{F_y + F_{y+1} + \ldots + F_x}{y}$$

forecasts appearing in the final input window,

A mean average can also be computed with single predictions removed, where each forecast is a function of a user number, a date and forecast. If $F_u$ is not repeated, then $F_n$ is not $$F_n = F(u, D, \%)$$

included.

Alternatively, simply excluding uses from subsequent forecasts when the user misses a week, can also serve to remove the need to back out the impact of predictions. When sufficiently high numbers of users are in the panel (e.g. 100 person panels) the impact of one forecast even when the forecast represents an extreme is minimized.

A time window average basis (e.g. 7, 14, 21 and/or 28 days) can also be used. If D>x days, then $F_n$ is not included. Time based can be combined with prediction removal so as to only count the forecasts (multiple forecast users) that have forecasts falling within the time range.

The relative rates of change of the consensus trends are also calculated.

$$R_c = \frac{\Delta C}{\Delta T}$$

where $R_c$ is the rate of change for consensus C as a function of time and forecast. The relative rates of change of consensus trend changes is also calculated which will indicate how consensus trends are changing relative to each other and whether a single or selected consensus is better suited for identifying the impact of a catalysts issue.

When each user is required to respond at the same time each week, $R_c$ simplifies to the difference between weeks (Week X consensus-Week X+1 consensus).

In comparing the consensus calculations the rate of change of the consensus over a given time period are compared. The time period can be predefined, such as 7 days, 14 days, 21 days, 28 days, two months, three months or longer. The time period can also be event dependent such that the rate of change is compared before and after an expected or unexpected event. For catalysts issue extraction it is preferable to receive inputs weekly and compare change on a weekly basis.

The individual rate of change and mean rate of change of a consensus are also used to determine the severity a catalysts issue has on the population. As mentioned previously, human behavior is not necessarily linear and changes may be more pronounced; greater than 30% and less than 70% with the potential for an ambivalent dead zone between 45% and 55%. Thus, in one embodiment, the rate of change in the 30% to 70% range is considered to have greater severity compared to a similar rate of change in the less than 30% and greater than 70% range. This is referred to as a rate of change amplification factor. In another embodiment, the rate of change amplification factor is applied to changes in the 20% to 80% range. In another embodiment, the rate of change amplification factor is applied outside of the ambivalent dead zone between 45% and 55%. The rate of change amplification factor can be non-linear.

J. Applications

The current system has many uses in optimizing messaging or in threat detection. For example, betting company may wish to monitor for manipulation of news designed to temporarily skew betting patters and odds. An existing product manufacturer may with to monitor for competitive messaging that is designed to shift purchasers to a competing product. A new product manufacturer may wish to uncover the implicit bias that is preventing the company from achieving its expected sales.

Figure 8A:
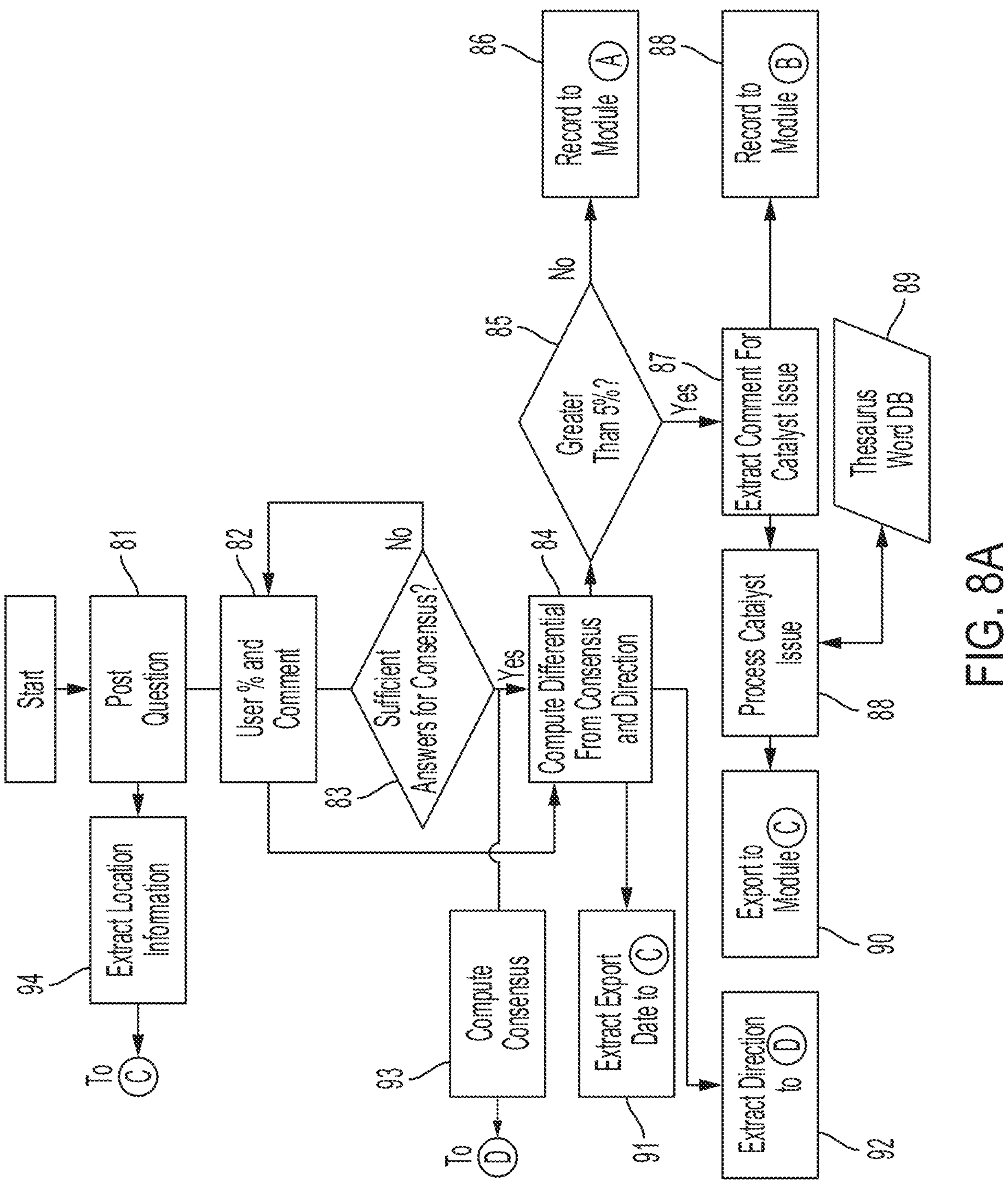
FIG. 8*a* is an exemplary flow diagram of a threat detection implementation.

A basic example of the system is shown in FIG. 8*a*. A question is posted at 81. From that question location information is extracted 94. The location information is used to determine the location of the catalysts testing. The user forecast and comment are recorded 82 and a determination is made if there are sufficient forecasts to compute a consensus 83. If yes, the consensus is computed 93. The user forecasts are also reviewed to determine the forecast differential (F-C Delta) from the consensus and the direction of the delta 84. The date is exported to 91 and the direction of the forecast is exported 92. If the F-C Delta is greater than a given percentage, 5% in this example, 85 the comment is reviewed to extract the catalysts issue. If not, the forecast and comment are recorded 86. The catalyst issue processing 88 includes resort to linguistic analysis including thesaurus and capturing of related concepts. That information is export in 90.

Figure 8B:
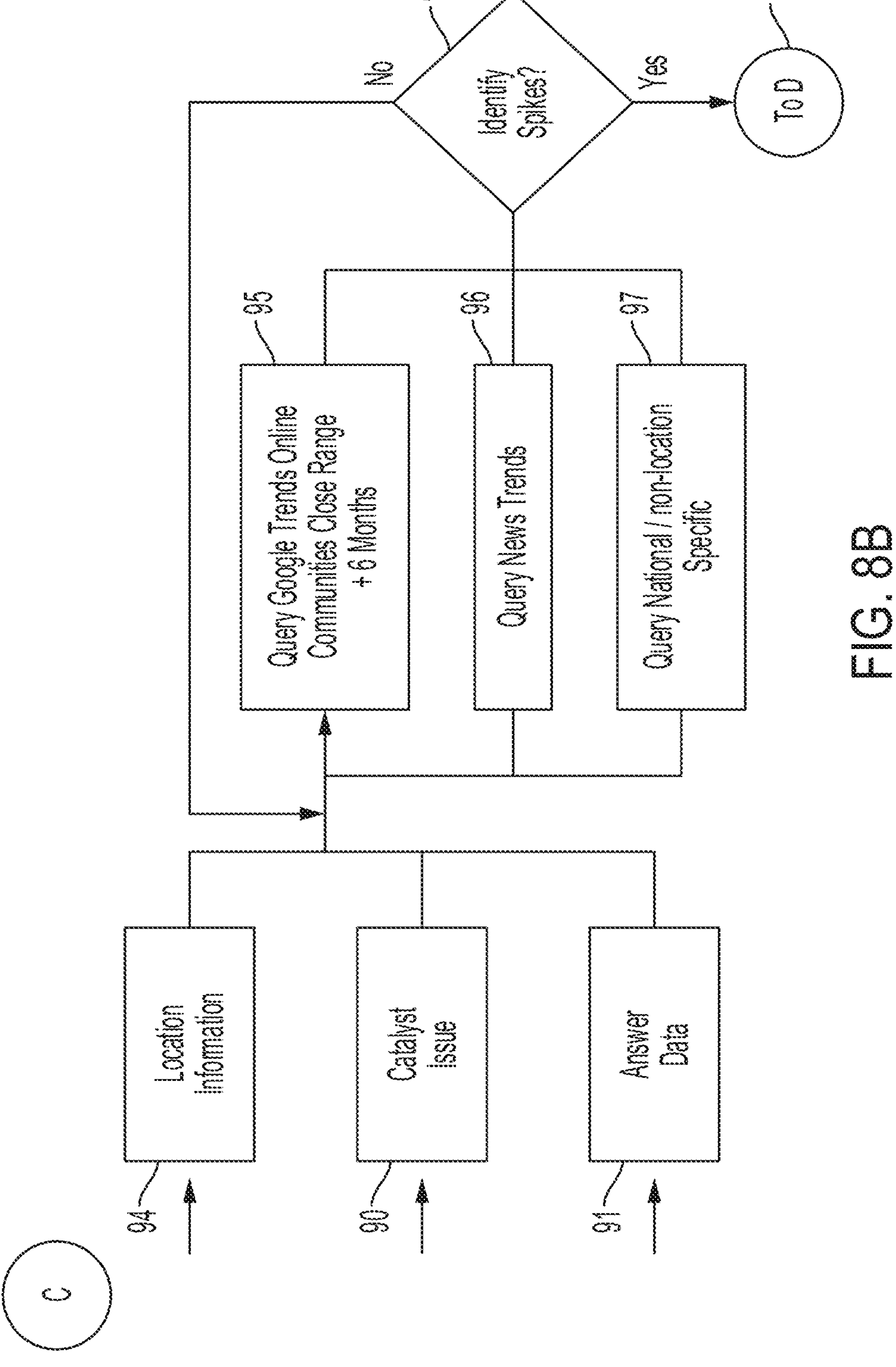
FIG. 8*b* is an exemplary flow diagram of the catalysts issue testing module.

As shown in FIG. 8*b*, location information 94, catalysts issue 90 and date information 91 is input to a google trends query 95. In this example, a 6 month time window is used to identify catalyst word usage. News trends can also be queried 96 as can national and regional specific news or on-line communities 97. The trend information is analyzed for spikes, which are defined as a higher than baseline usage of the catalysts issue. The goal is to identify the presence of the catalysis issue that is sufficiently different from background noise associated with the issue. That spike, 98, is then exported at 99.

Figure 8C:
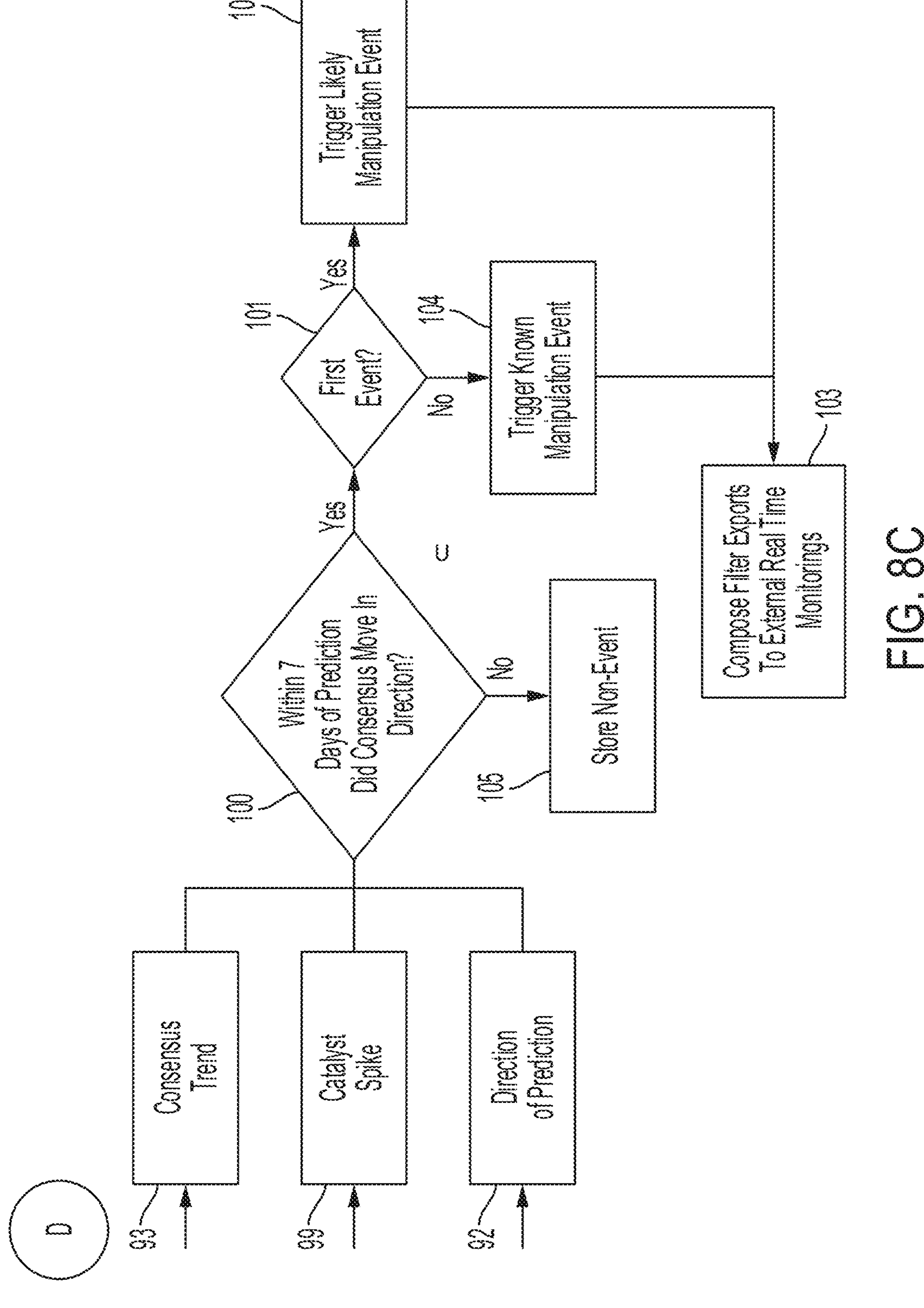
FIG. 8*c* is an exemplary flow diagram of the verification and threat level setting module.

As shown in FIG. 8*c*, the consensus trend 93, catalyst spike 99 and direction of prediction 92 is input to determine if within 7 days of the spike the consensus moved in the expected direction 100. If there was no confirmation, the data is stored 105. If the consensus moves, the system is queried if this is the first event 101 and if no a likely manipulation event 102 is set. If not, and this is a repeat event, a known manipulation event is triggered at 104. The system then can compose a filter at 103 for real-time monitoring of future online media activity for manipulation or threat detection.

Figures 8D, 9:
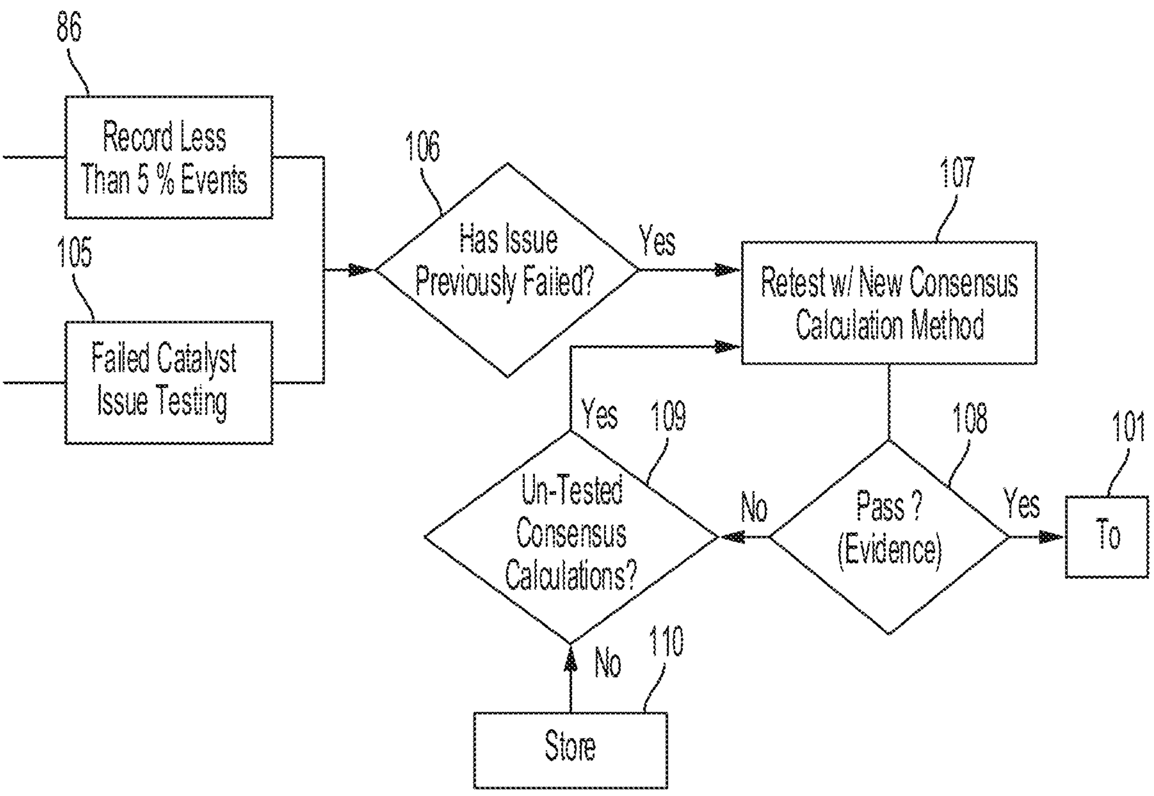
FIG. 8*d* is a schematic representation of secondary detection programs.
FIG. 9 is an exemplary flow diagram of the failed forecast testing.

As shown in FIG. 8*d*, module A receives non-actionable events from 86 and 105 and compiles the information. As shown in FIG. 9, the information is examined to determine if it previously failed 106. If so, the consensus used is changed and the issue is retested 107. If the catalysts issue tests positive, it is passed to 101. If the catalysts issue does not pass, the system checks for other consensus calculations 109 and routes back to 107 or stores the information as a failed test 110. Information that fails can be preprocessed with different thresholds, other than 5%. It is contemplated that thresholds as low a 0.5% can be used if the user base and sensitivity of the consensus calculations is sufficiently precise. Precision is a function of false positives, issues testing positive but not subsequently proving useful in moving the consensus. It is generally preferred that the system bias in favor of false positives when in a detection mode so that it does not miss actionable catalysts issues. When in a marketing message development mode, it is preferable to bias the system against having false positives to ensure that the developed message will move the consensus.

Figure 10:
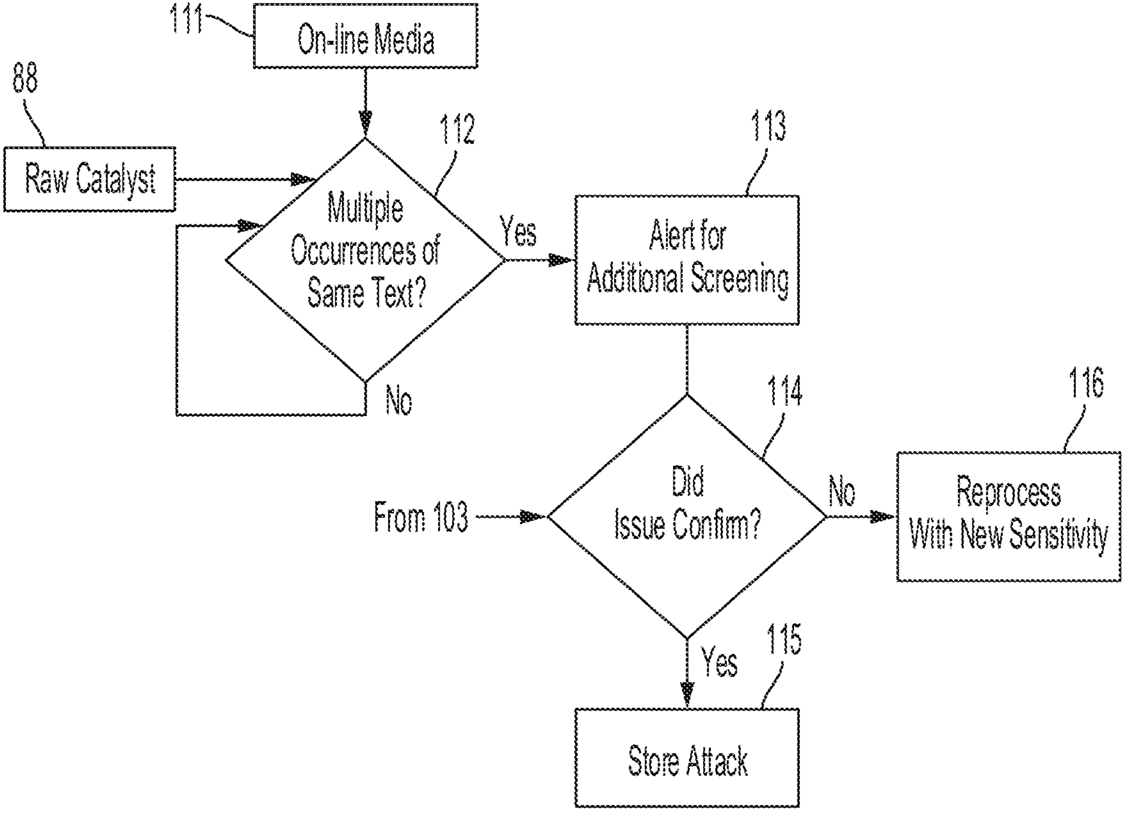
FIG. 10 is an exemplary flow diagram of raw catalysts issue testing.

As shown in FIG. 10, Module B is 88 captures the catalyst issues for secondary monitoring by filtering real-time online activity for multiple repeated postings of the issue (e.g. multiple tweets on the catalysts issue) regardless of whether the system has confirmed the issue as a potential threat. Raw catalysts data 88 is compared to online media data 111 to determine if the issue is present in multiple posts that include the same or similar text relating to the issue 112. Posts that appear during a 24 hour period are considered to be more likely to represent a previously undetected manipulation event. If an event is detected, a secondary screening alert 113 is issued and the issue is also compared to the results of the testing 103. If the manipulation event did not previously test positive, the system re-process the data using an increased sensitivity range (e.g. less than 5%). If the event confirmed and the catalysts issue previously tested positive, the detected event is stored at 115.

The current system ideally contains a database 116 as shown in FIG. 11 that tracks user's on a question basis and tracks all aspects of the interface interaction. Data to be collected includes: tracking number, date, time, question number, forecast, comments, consensus data displayed, comment data displayed, news data displayed, and timing of user interaction.

K. Mind Melt Trivia

The features of Mid Melt Trivia include the following:

1. Daily multi-question trivia/comprehension contest;
2. Forecasting earns points that are converted to lives used to advance to the next trivia question after a wrong answer;
3. Format: Intro, Content Insert (See #4), Question re: Content Insert, Resolution, and Trivia questions and Resolution;
4. Content insert that can include brand lift questionnaire, placed news (catalysts issue test) or paid advertising;
5. Play as a group, including Twitter lists, sports teams/bars/churches and regions; and/or
6. Winning distribution as a phone credit or Promotional sales (e.g. gift cards).

FIGS. 12 through 28 represent one possible front end application implementation of aspects of the present invention.

Figure 12:
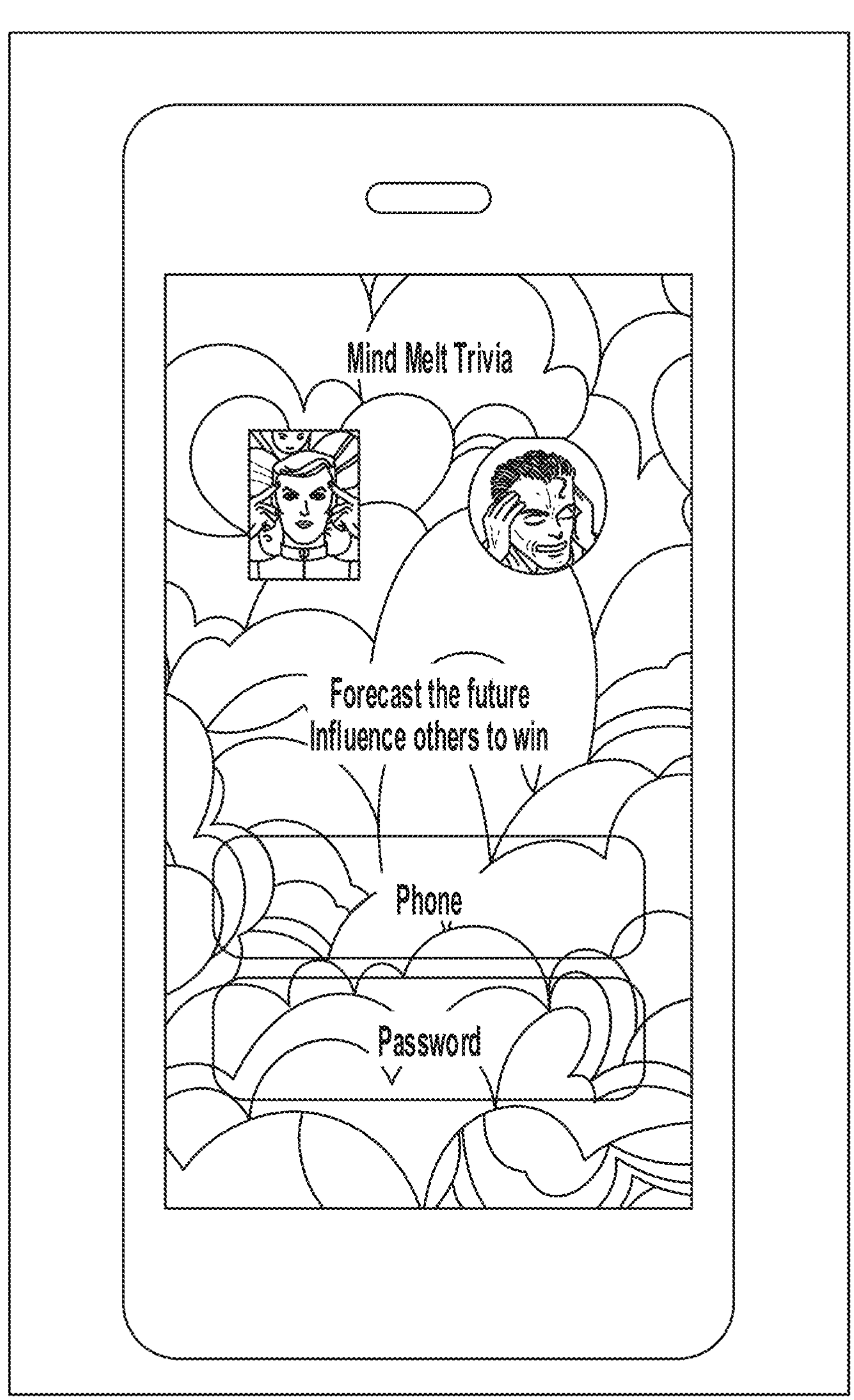
FIGS. 12 through 28 are screen shots of an exemplary front end product incorporating aspects of the present invention.

FIG. 12 represents a login screen in which the user will use their phone number as their ID. Phone numbers allow regional segmentation of the users based on area codes thereby providing anonymized geographic information.

Figure 13:
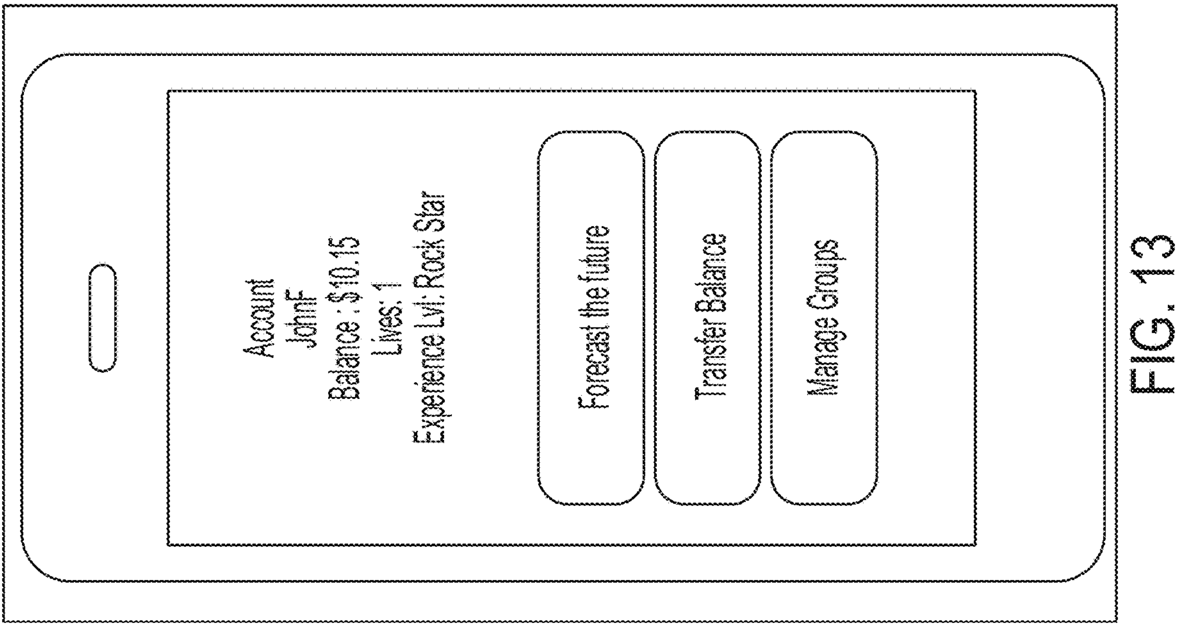

FIG. 13 represents an account page. Forecasting earns lives which are awarded based on the quality of the answers (not automatic) and whether user could influence or predict the final consensus. Groups link to Social Media (e.g. Twitter) so that users can play together (common causes) or to make people pick the wrong answer.

Figure 14:
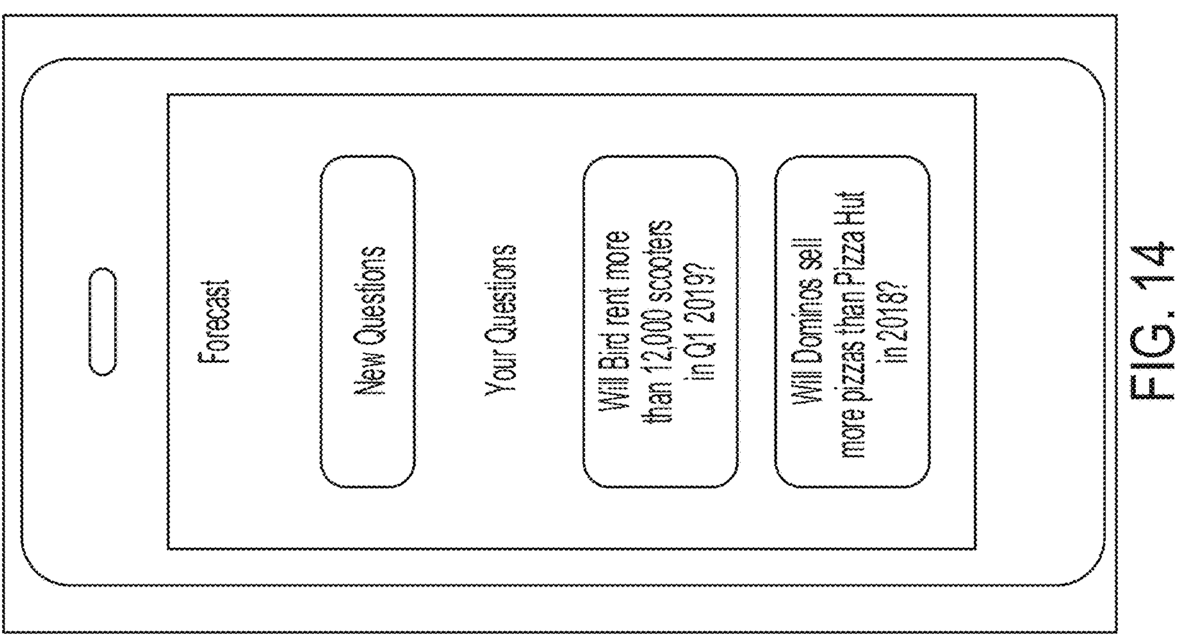

FIG. 14 represents a question page. Questions can be selectively offered to groups based on area code of phone number to allow for regional testing of issues or of advertisements. Question include paid for research topics as well as questions of general interest.

Figure 15:
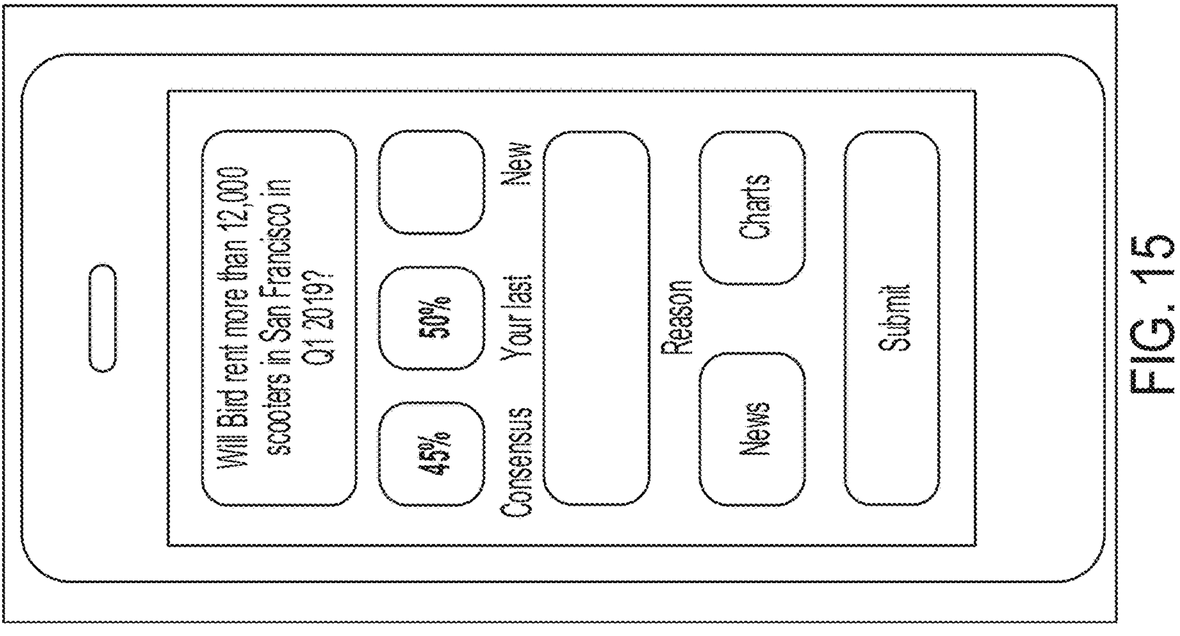

FIG. 15 represents a question forecasting page. The consensus shown on this page can be altered as noted above to assist in bias extraction. News and Charts can be randomized or A/B tested to determine impact.

Figure 16:
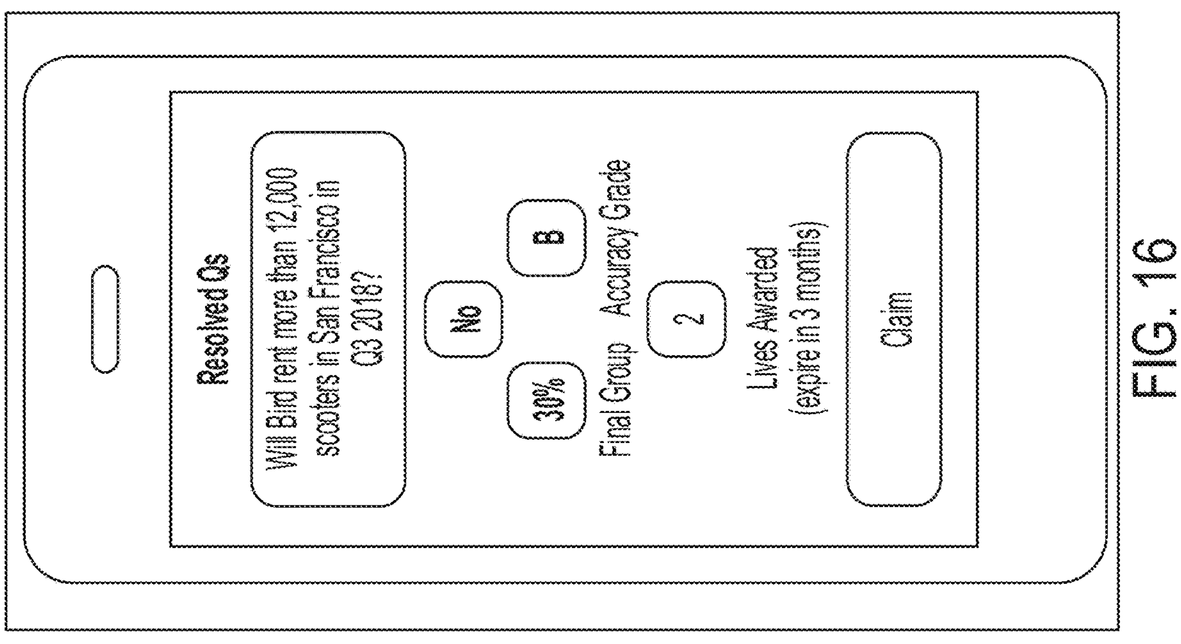

FIG. 16 represents a resolved question page. Because the consensus can be altered it is anticipated that the system will use banded accuracy scores such that the Brier score will be computed and compared to the displayed or generalized consensus with also factoring in the participation rate. Bands will then be displayed such that the user is provided with meaningful feedback. Lives will expire so that the system encourages participation.

Figure 17:
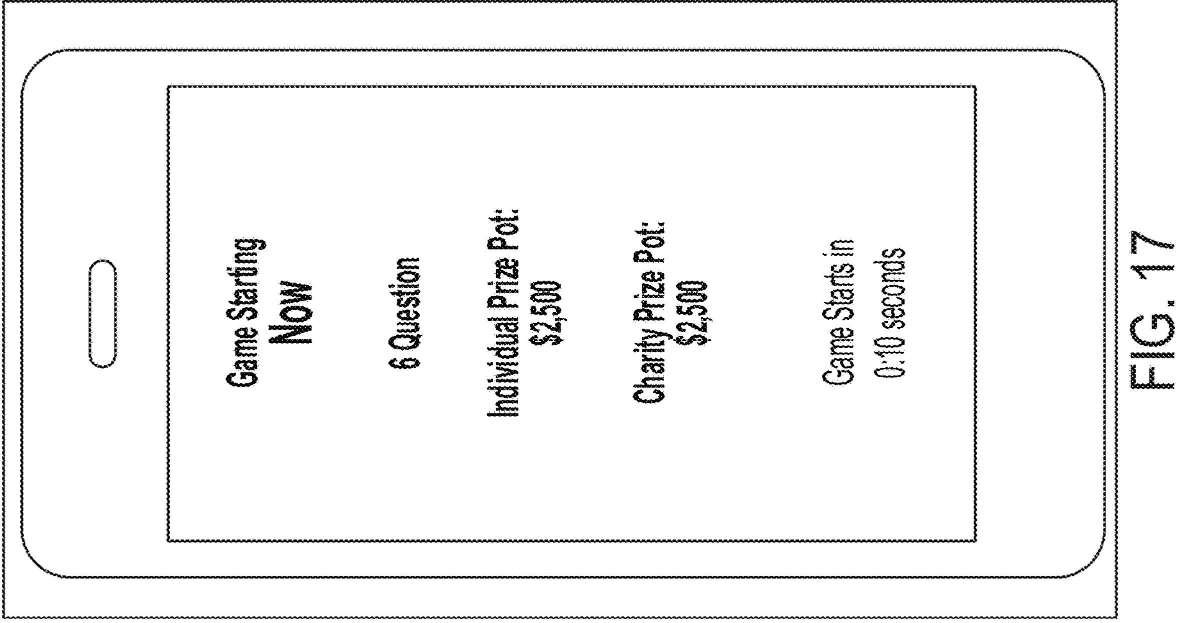

FIG. 17 represents a game starting page. Charity prize pot encourages users to link to causes and play for an aggregated donation to that entity.

Figure 18:
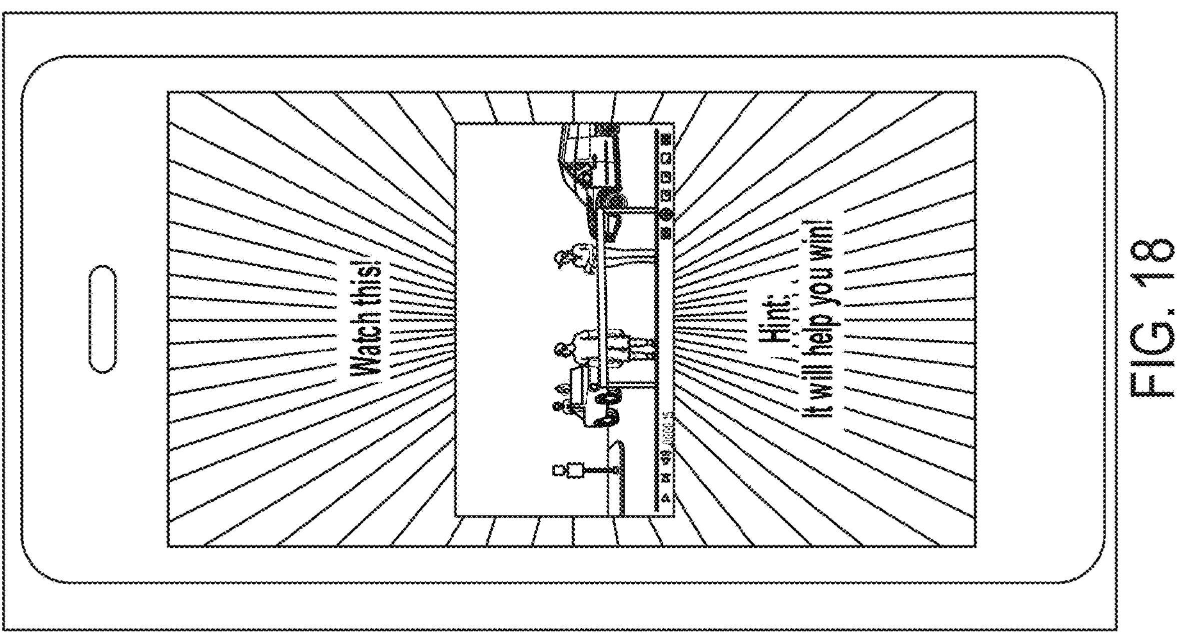

FIG. 18 represents a content placement page. As users are hyper-focused waiting for the start of the game, content is displayed. The first question will generally relate to this content to encourage users to watch it. The placement of curated content in a gamified setting increases stickiness.

Figure 19:
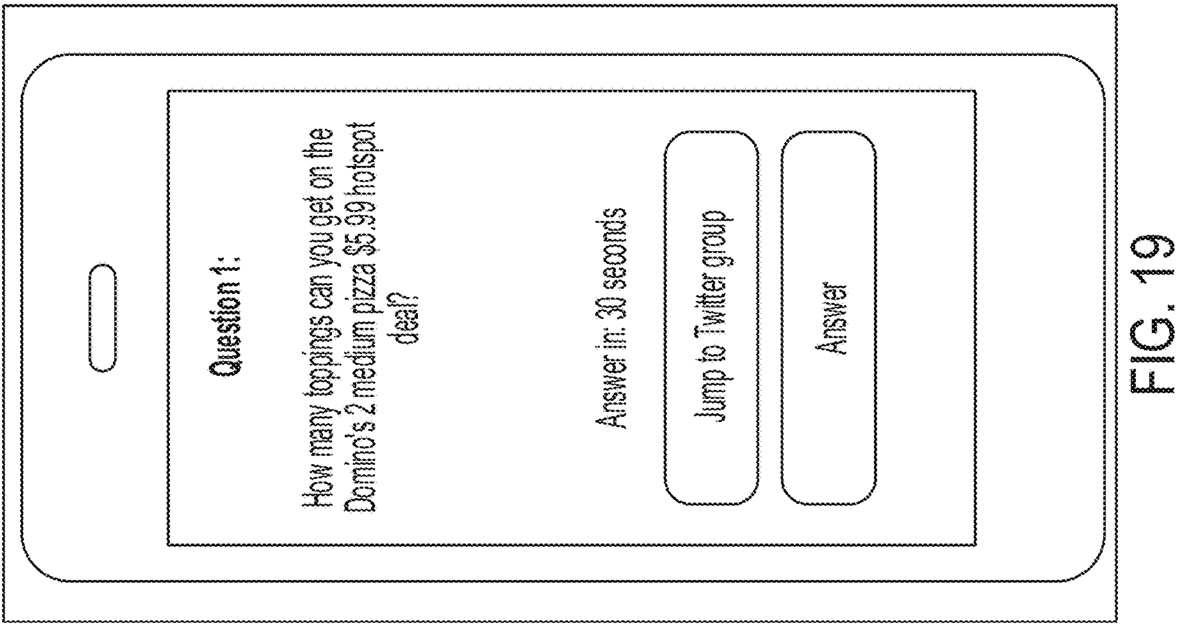

FIG. 19 represents a question page. Linking to groups allows the system to identify public user networks for influence campaigns. Charity and cause prize pots assist with public network mapping. In the charity or cause prize pot, users play to win money for a common cause. This encourages group coordination and communication. Answers are generally not shown until after a user exits the ability to communicate with the group.

Figure 20:
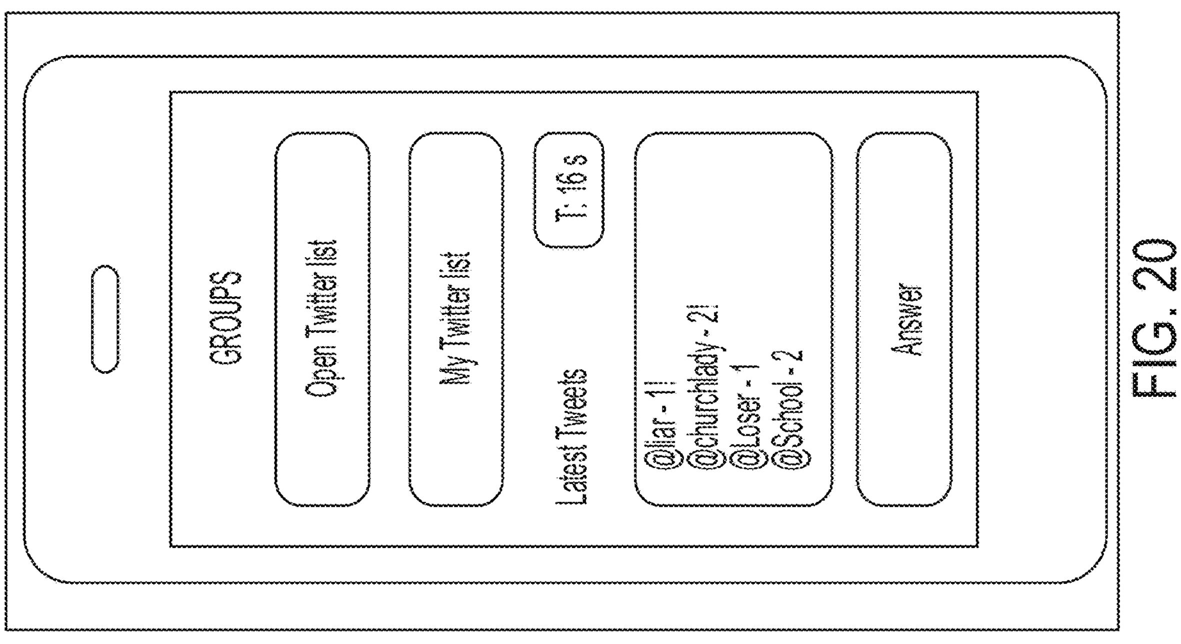

FIG. 20 represents a group page. Groups link to app created and controlled private Twitter lists. Users can be good or evil as they attempt to influence others to or away from potentially correct answers.

Figure 21:
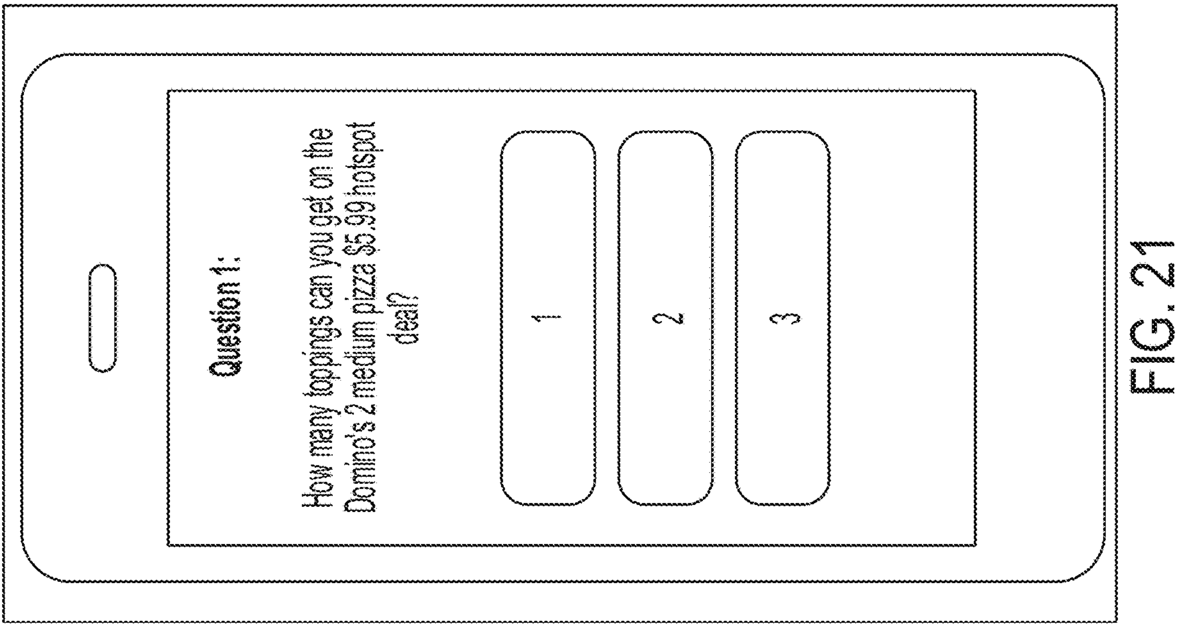

FIG. 21 represents a question answer page.

Figure 22:
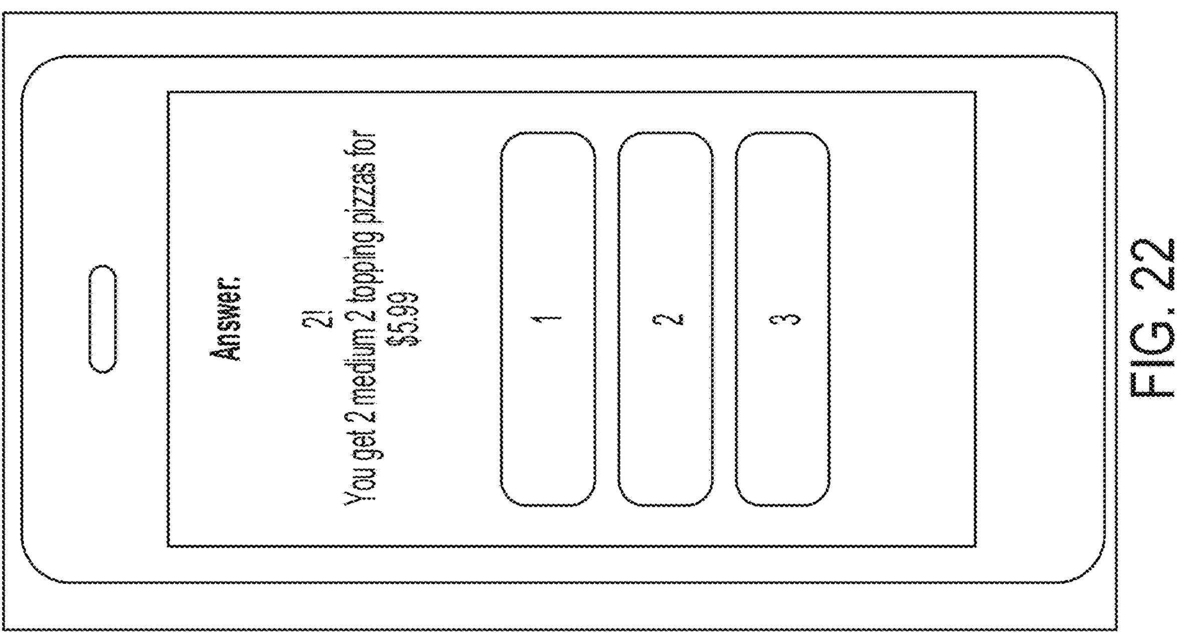

FIG. 22 represents an answer page where the answer is communicated to the user.

Figure 23:
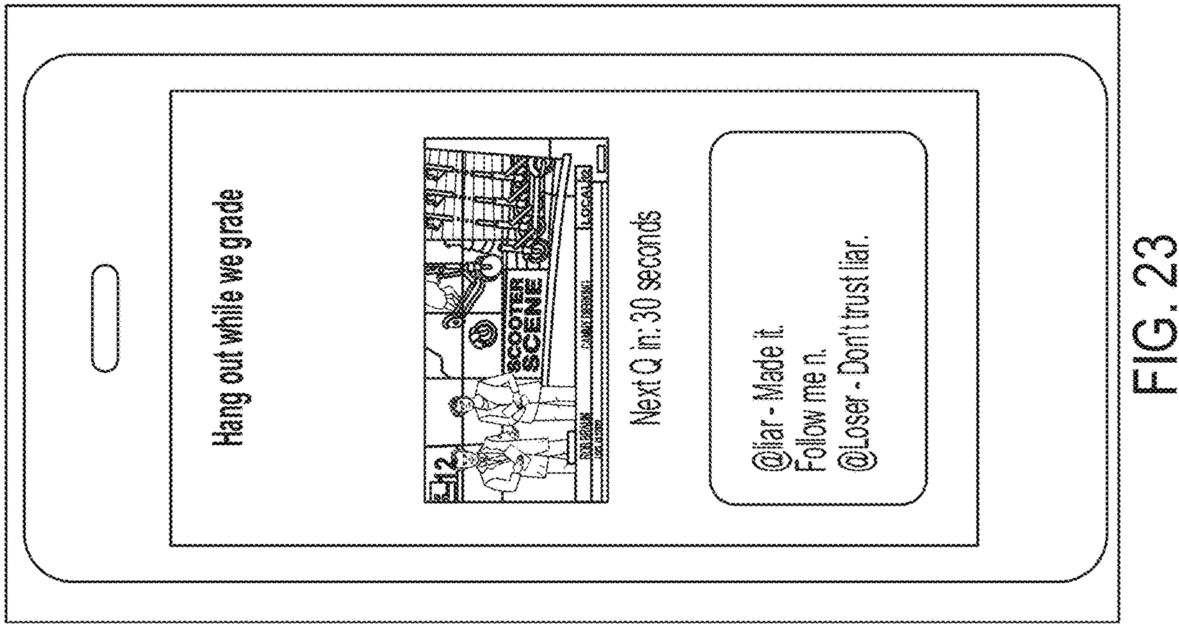

FIG. 23 represents a grading answer page. While the system grades the individuals and computes the groups that still exist, additional premium content or news testing can be presented to the users.

Figure 24:
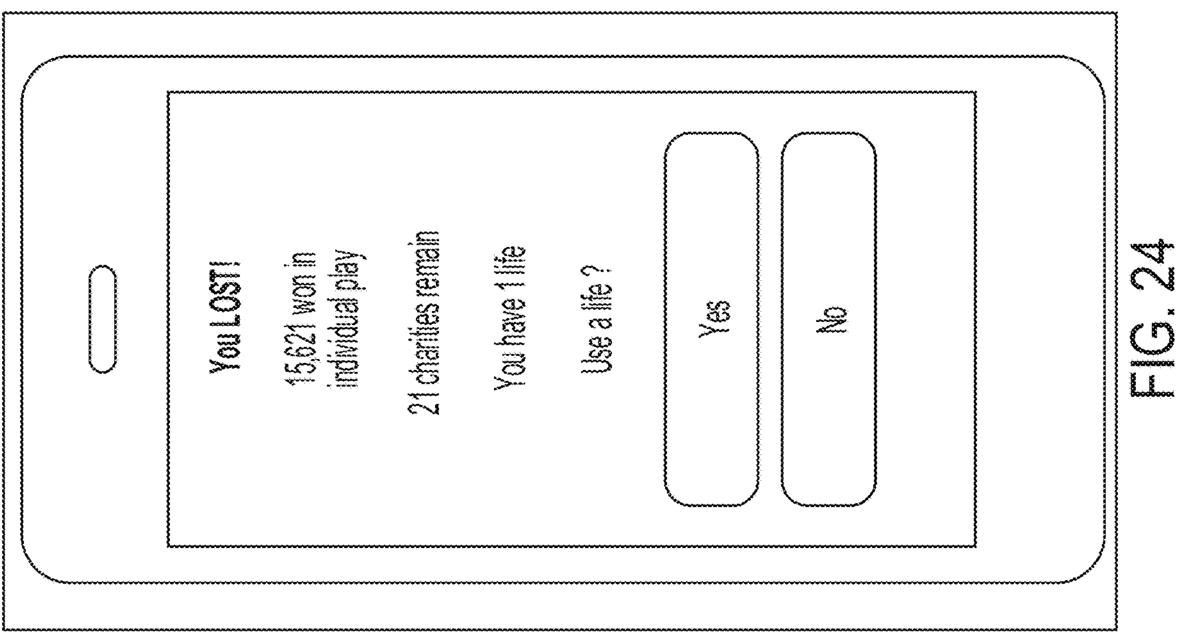

FIG. 24 represents a wrong answer page. Forecasting the future not only helps with lives but also helps answer questions as future questions can be taken from the news and forecasting data.

Figure 25:
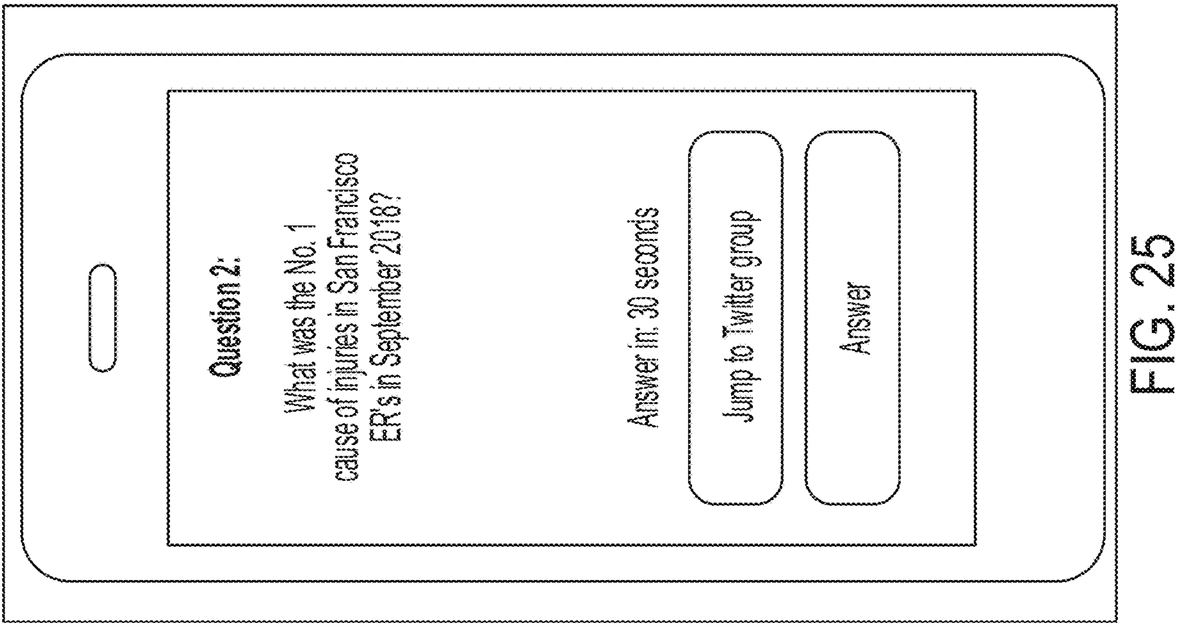

FIG. 25 represents a second question page. Progressively harder questions can be pure trivia or tie into forecasting topics to encourage forecasting.

Figure 26:
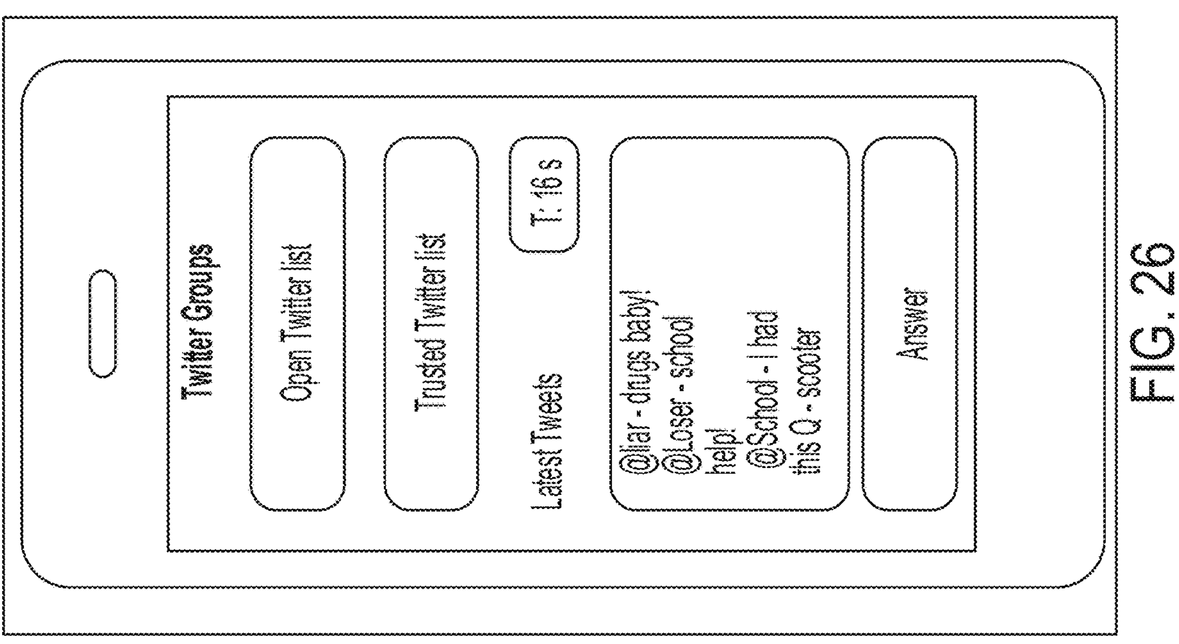

FIG. 26 represents a group page for the a second question. As the questions get harder, teams need to play together or stand on their own.

Figure 27:
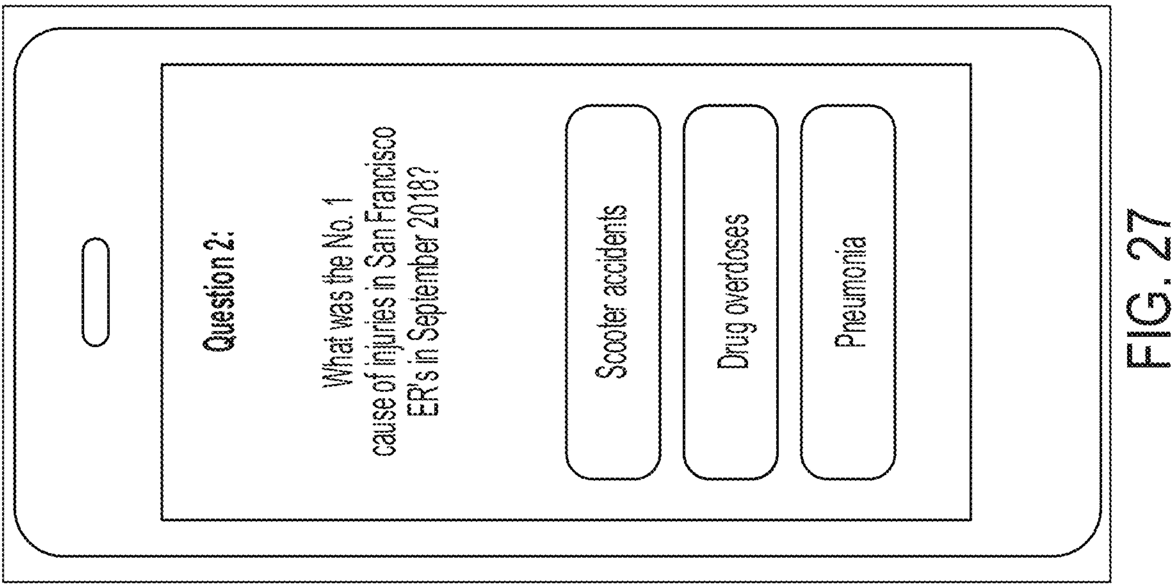

FIG. 27 represents a second question answer page. If a user forecasts the future and is exposed to news stories, they are more likely to go deeper in the contest.

Figure 28:
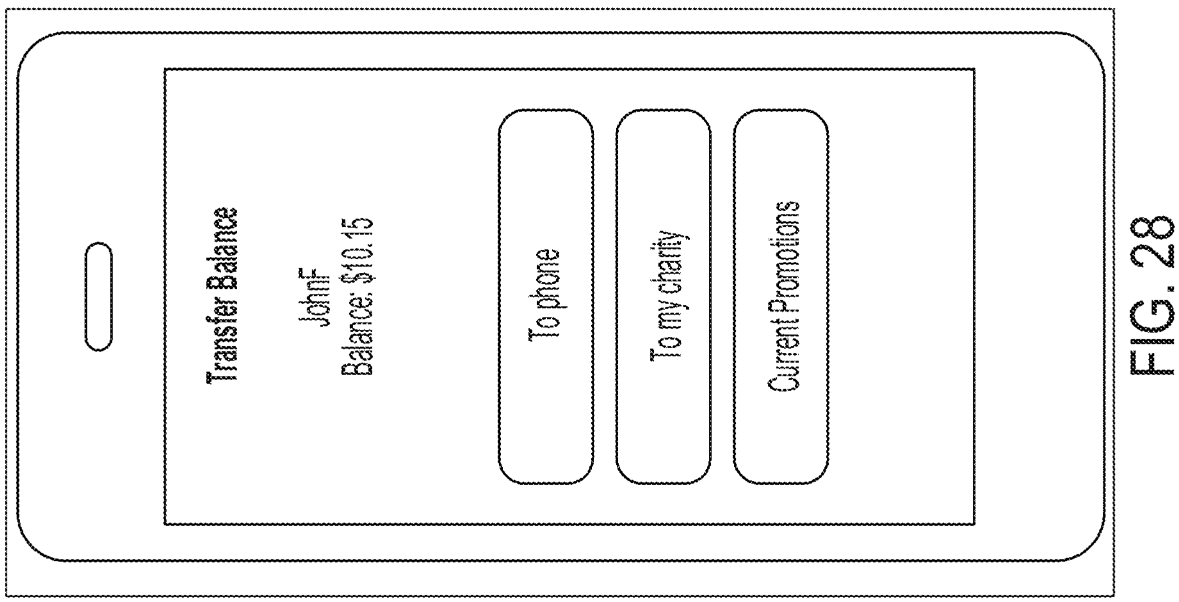

FIG. 28 represents a transfer page. Ideally, the system does not send cash. Rather, it sends credit to the carrier associated with the phone, send aggregated funds to a charity or link to promotions (e.g. Dominos coupon specials.)

L. Combating Social Media Manipulation

FIGS. 3-10 in U.S. Provisional Application No. 62/769,058 have been renumbered FIGS. 29-36. The item numbering has remained the same.

As used herein, social media manipulation can comprise foreign propaganda being inserted into social media, but it also can comprise non-paid advertising that an entity attempts to distribute onto a social media platform and bypass the paid advertising regimes and restrictions.

Figure 29:
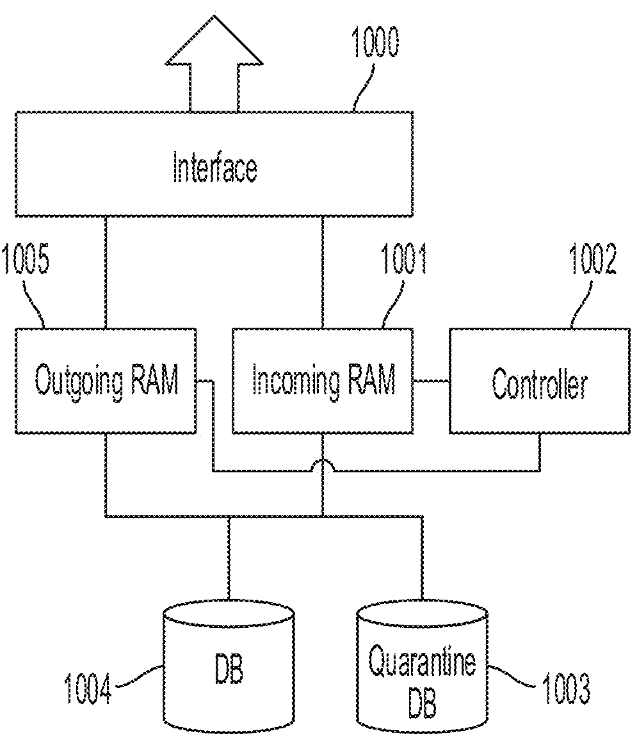
FIG. 29 is a schematic example of a quarantined system.

As shown in FIG. 29, an interface 1000 can be provided either integrally with existing platforms such as Twitter or Facebook, or the interface 1000 can be provided remotely. A remote application allows country specific rules to be put in place such that all Tweets into a given State or country can be subject to the current system while not impacting other geographic areas. Interface 1000 is connected to incoming message memory 1001 and outgoing message memory 1005, both of which are controlled by controller 1002 and connected to database 1004 and quarantine database 1003. The memories can be combined or further separated by adding an additional log structure to track individual posts. In the present invention, posts and news are discussed. The terms are interchangeable and intended to refer to a user's information feed, whether coming from others or self-created.

Delays in the current invention are delays imposed by the system as a function of the message content. Delays do not refer to technical problems that delay all messages regardless of content. Delays do not require user action to clear as the goal is to provide the user with content that is not censored. User's deciding to delay when an email is sent or deciding when a message is posted, address a different issue from the current invention. The present invention is designed to solve the problem of on-line media attacks and as such is concerned with delaying posting of information to lessen its impact on users and lower the desire to act on the information, including mindless reposting.

In addition, the term delay is used throughout the invention and described in various increments, 5 seconds, 30 seconds, etc. The delay can be a reduction in the average frequency in which a story, term or issues is present, or it can be a delay that exceeds the user's attention span. Because each user may be different, users are assumed to have a common attention span. Current literature indicates that the attention span is 12 second. See internet.psych.wisc.edu/wp-content/uploads/532-Master/532-UnitPages/Unit-09/Attention Goldfish Abbreviated.pdf. The delay is intended to take a user close to the limits of their attention span or over it. 5 seconds represents 41% of an average user's attention span. 30 seconds exceeds the 12 second attention span which forces the individual to re-engage with the online media. The goal is to disrupt the automatic response to either posting or consuming news and thus a delay of 40% or greater is thought to be helpful. In certain embodiments the delay correlates to the standard frequency of user news consumption or to the issue appearing in a news feed. In those cases, the delay is a function of those frequencies.

Figure 30:
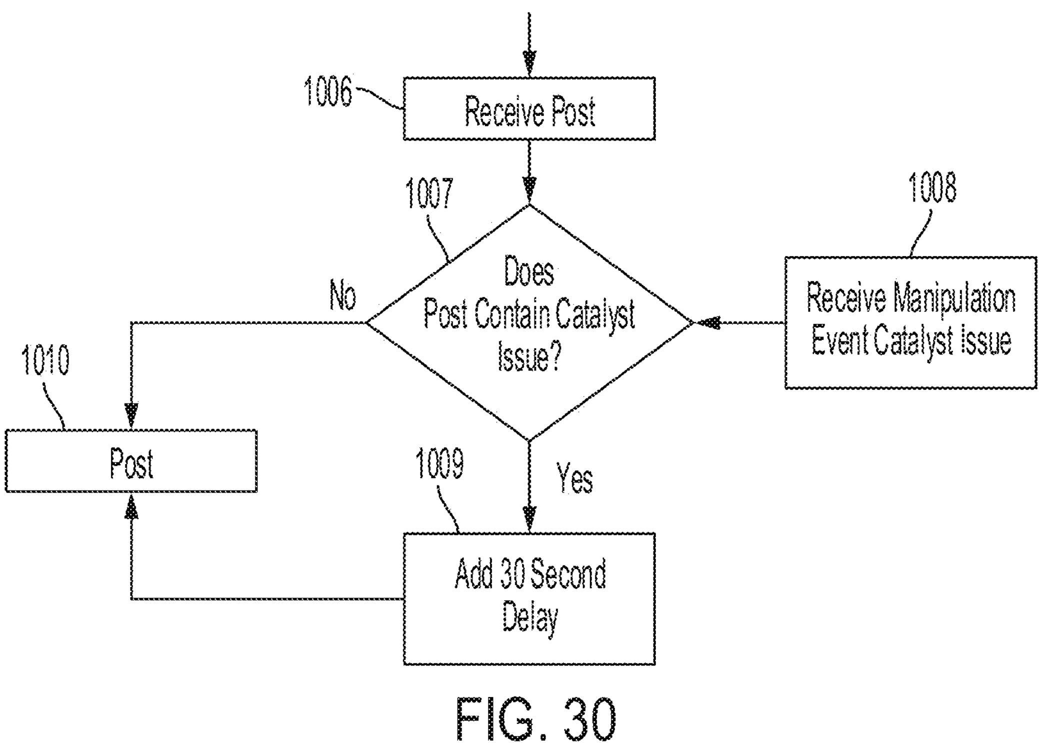
FIG. 30 is an exemplary flow diagram of one embodiment.

A base implementation of the current invention is shown in FIG. 30, in which posts are received 1006. The post is analyzed to determine if a catalysts issue is present 1007. Catalysts issues are terms that have been previously identified as likely corresponding to a potential manipulation event 1008. If there is no catalysts issue present in the post, the post is passed for normal processing and posting 1010. If a post contains a catalysts issue, the post is quarantined and posting is delayed for 30 seconds 1009. Posting time can be as short as a 5 second delay. This example uses posts, but the example is equally applicable to news. The post can be incoming or outgoing.

Figure 31:
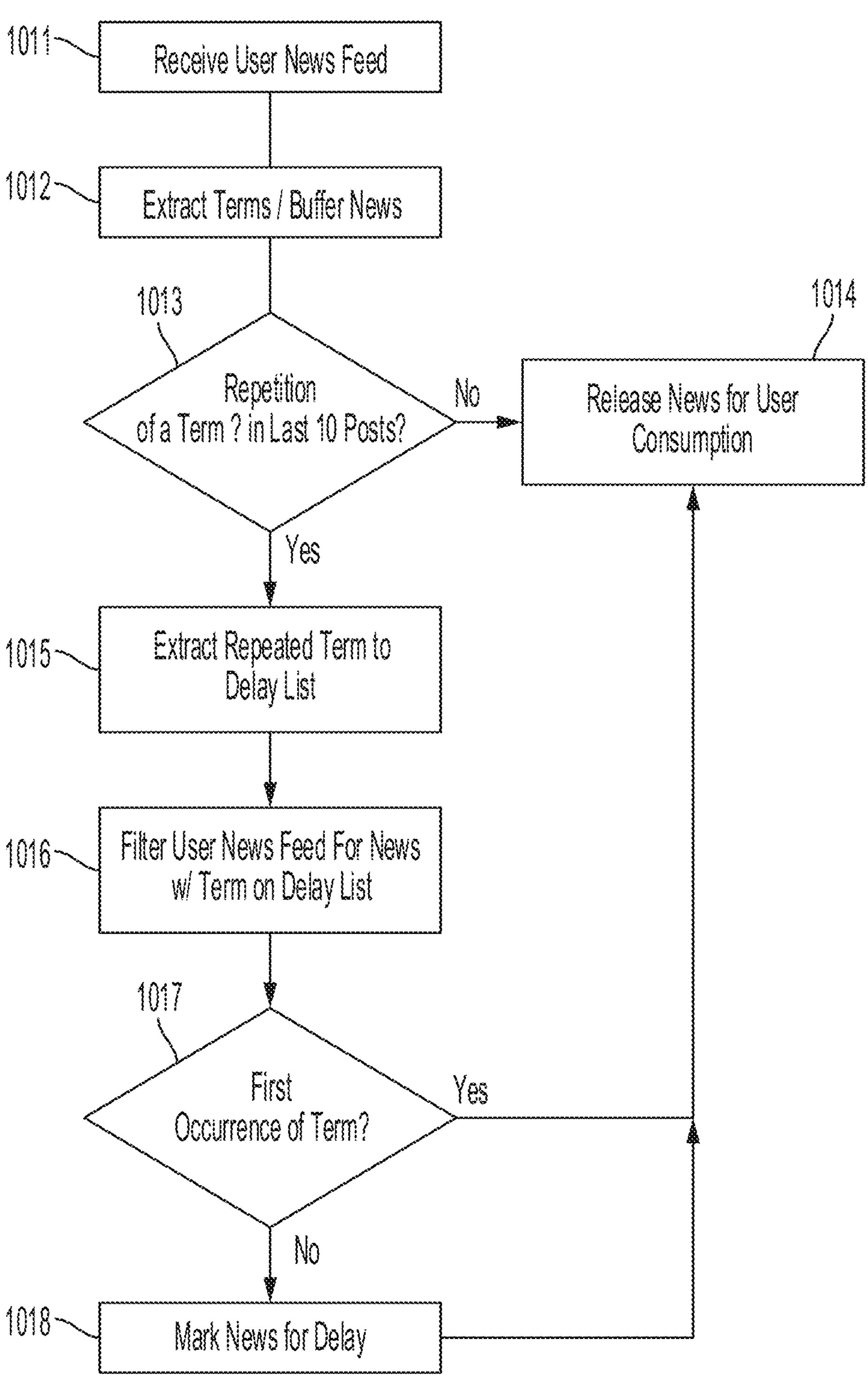
FIG. 31 is an exemplary flow diagram of a news screening embodiment.

In another embodiment as shown in FIG. 31, a user's news feed (or post feed) is received 1011. The system extracts from the news feed terms that are present and buffers the news 1012. If extracted terms repeat between posts, in this example 10 posts 1013, the system adds the terms to the delay list 1015. Minor terms such as pronouns, common verbs, etc. are not posted on the delay list. Rather the extracted terms generally include, but are not limited to, issues, people and provocative terms. User's news is then filters for terms on the delay list, which will capture the news that was just identified as having repetitive terms 1016. This step can be integrated into a previous step but is shown as a separate step for explanatory purposes. If the repetition is the first occurrence of the term, the news is released for user consumption 1014. If the repetition is not the first occurrence, the news is marked for delay and delayed 1013.

Figure 32:
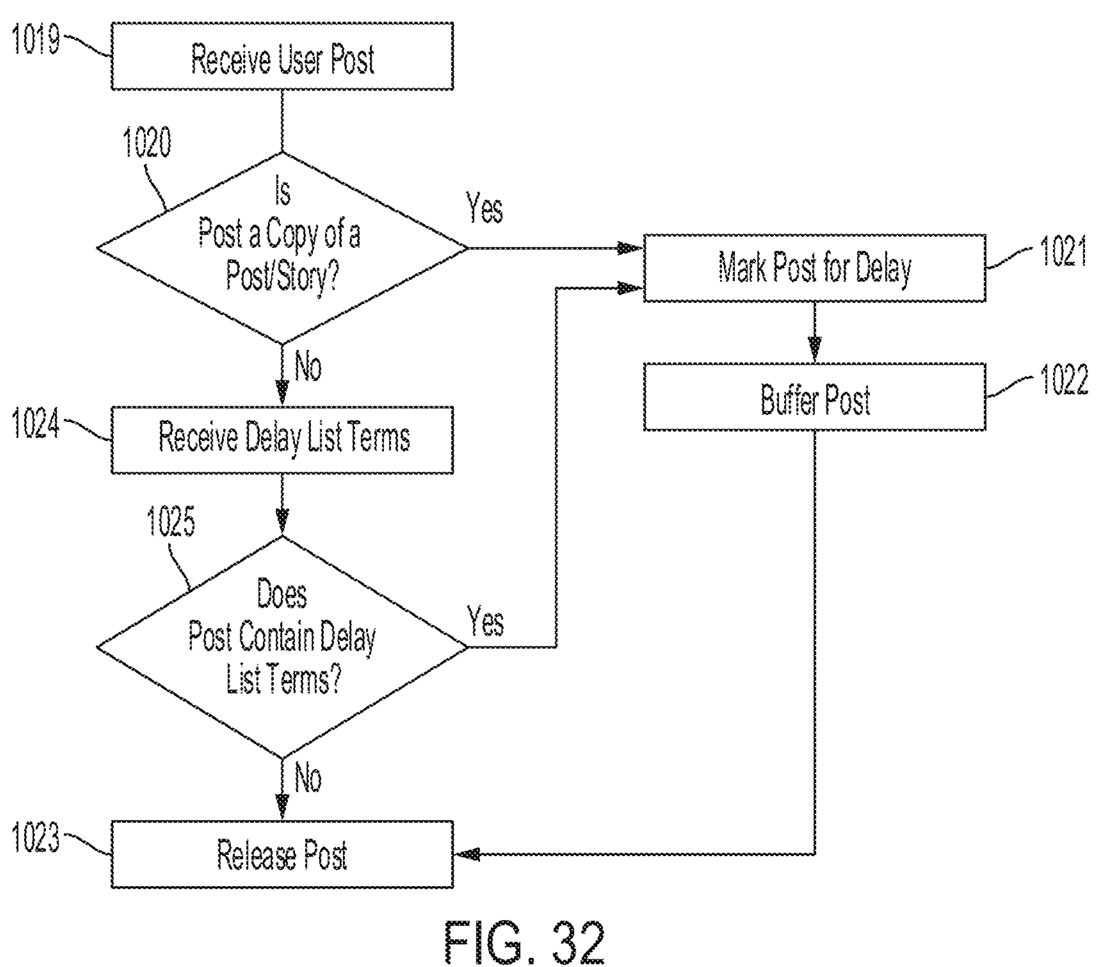
FIG. 32 is an exemplary embodiment of a user post screening embodiment.

FIG. 32 shows an embodiment that can be deployed on the user side to delay uploading and sending of posts. A user's posts are received 1019 and a determination is made whether the post is a copy (e.g. re-Tweet) 1020. If so, the post if marked for delay 1021, buffered 1022 and then ultimately release for posting 1023. If the post is not a copy, the delay list terms are received 1024 and the post is analyzed to determine if the post contains any matching terms 1025. If so, then the post is marked for delay 1021, buffered 1022 before ultimately being released for posting 1023.

Figure 33:
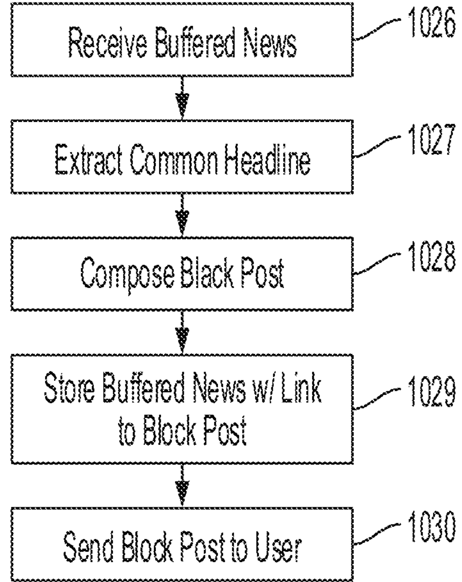
FIG. 33 is an exemplary embodiment of the block post subroutine.

FIG. 33 relates to the creation of block posts. To lessen the impact of multiple posts on the same subject matter, the current invention also proposes the use of block posts. Received news is buffered 1026 and a common headline is extracted 1027. The block posts is then composed and is a function of the common headline with reference to all or some of the sources 1028. The block post with links to the source media is stored and then the block post is provided to the user 1030. Because the headlines are passed and the source material remains available this is considered within the definition of a delay. The source links can be subsequently updated without immediate rebroadcasting to the user. If sufficient new links emerge after posting, the media can be selected for re-posting to a user. By consolidating the posts, the user is not deprived of any content and can access the individual posts. The user, however, is not bombarded with multiple posts on the same subject matter. Because manipulation events are often characterized by multiple posts on a single issue, the use of block posts is an effective way to minimize the impact of manipulation events while not engaging in censorship that deprives the user of access to content.

Figure 34:
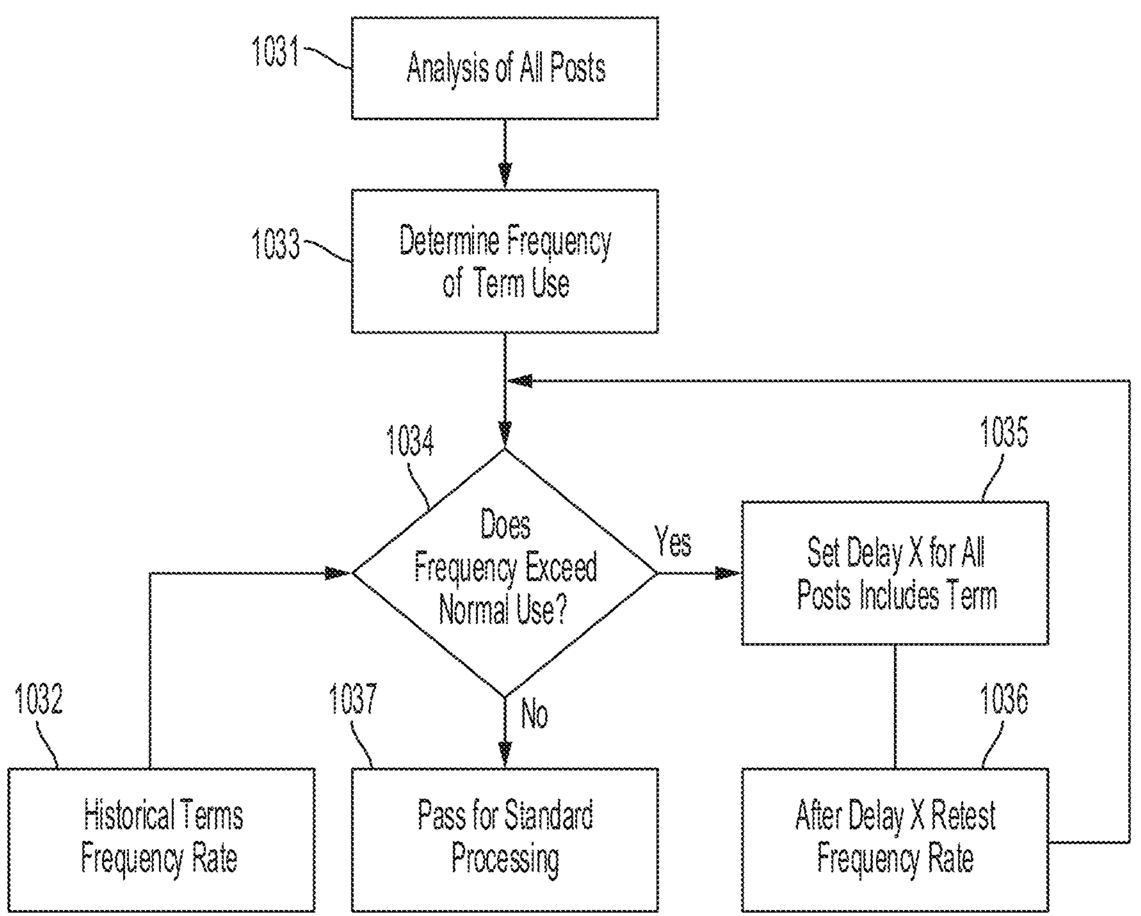
FIG. 34 is an exemplary embodiment of a variable frequency delay system.

FIG. 34 shows an embodiment with a variable delay embodiment. All posts are analyzed 1031 and the average frequency for term use is determined 1033. If a post uses a term and the post represents an increased use frequency use 1034 as measured against the historical rate 1032, the post is marked for delay and the frequency rate is retested 1036. If the post is within the historical frequency, the post is passed for standard processing 1037. The frequency is a function of the term and the number of posts (e.g. issue X appears in 1 out of every 10 posts on average). The number of posts used to determine the frequency can depend on the individual issue as some terms may not appear very often and as such the rate may be closer to 1 in 20 or more.

This variable delay embodiment will not delay the initial posts containing the term. Rather, when the frequency exceeds the standard then delay will be implemented. This allows the user to see an initial few posts on the issue and then delays the remaining posts until such time as the delayed posts can be reintroduced into the feed without adversely impacting the historic frequency. During a manipulation event where a news feed or posts are inundated with an issue, this method allows a user who would otherwise routinely read or post on an issue to be exposed to a higher number of posts involving the issue than a user who does not normally read or post on the issue.

Figure 35:
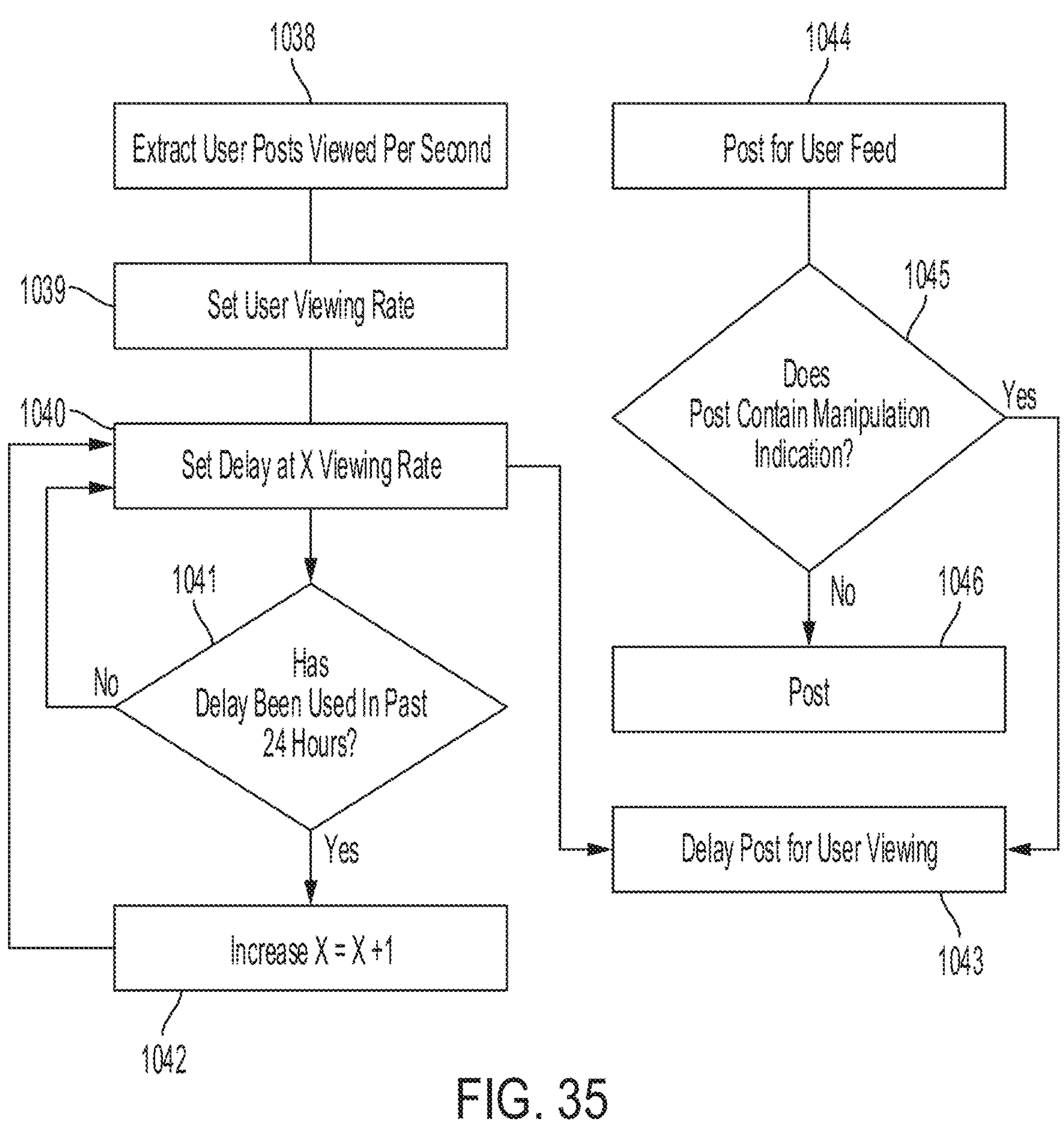
FIG. 35 is an exemplary embodiment of a variable frequency delay system.

FIG. 35 is an alternate embodiment where the delay is calculated as a function of the user's viewing rate so it delays potential manipulation posts just longer than the user's average viewing rate. Posts for a user's feed 1044 are analyzed to see if they contain a catalysts issue (e.g. manipulation indicator) 1045. If yes, the post is delayed at 1043. User's posts viewed per second 1038 are retrieved and an average viewing rate set 1039. The delay is set at X which is a function of the viewing rate. The viewing rate can be used to estimate the user's attention span, such that X can be set at 40% of the estimated attention span. If a delay has been applied in the previous 24 hours 1041, the delay is increased 1042 and set 1046. The amount of increase can be by second or percentage of estimated attention span.

Figure 36:
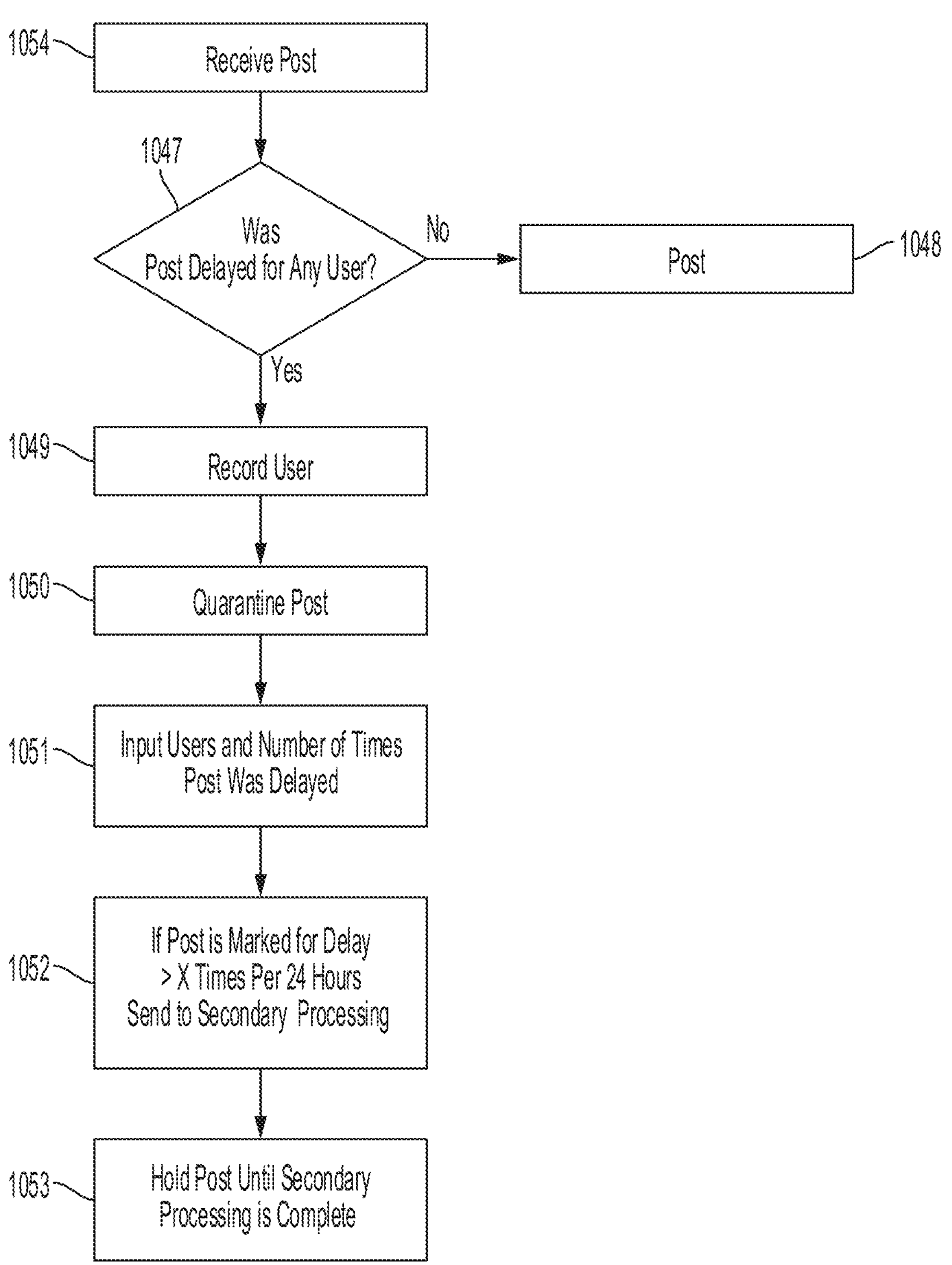
FIG. 36 is an exemplary embodiment of multi-user screening and quarantine system.

FIG. 36 is embodiment in which the delay is calculated across all users and posts that are subject to delays are quarantined for secondary screening (e.g. origination determination) prior to release. This embodiment is designed to catch large scale attacks targeted at multiple users. It will also capture natural disasters and related events, but the validity of the event in those situations can be quickly determined such that the posts can be released without substantial delay. Posts as received 1054 and the system check is the post was delayed for any user 1047. If no, the post is posted 1048. If yes, the user associated with the delay is recorded 1049 and the post quarantined 1050. The number of users and number of delays is inputted and/or received if multiple systems are in use 1051. If the post has been marked for delay in excess of X times 1052, the post is sent to secondary screening and held until cleared 1053. The number of times that a post can be delayed without triggering secondary screening can vary. Because most on-line attacks involve a limited number of re-posting (e.g. re-tweets) that then appear before a large number of users, X can be as small as 6 such that 6 delays in a 24 hour period triggers a larger quarantine and secondary screening.

M. Miscellaneous

Although not required, one of ordinary skill in the art will appreciate that various aspects described herein may be embodied as a method, system, apparatus, or one or more computer-readable media storing computer-executable instructions. Accordingly, aspects may take the form of an entirely hardware embodiment, an entirely software embodiment, an entirely firmware embodiment, or an embodiment combining software, hardware, and firmware aspects in any combination.

As described herein, the various methods and acts may be operative across one or more computing devices and networks. The functionality may be distributed in any manner or may be located in a single computing device (e.g., a server, client computer, or the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order and that one or more illustrated steps may be optional. Any and all features in the following claims may be combined or rearranged in any way possible.

The invention claimed is:

1. A method for media manipulation detection or media threat detection comprising performing a machine-executed operation involving instructions that, when executed by one or more processors, cause the one or more processors to:

direct anonymous users onto the system;

assemble said users into panels, wherein panels are seated for a preset period of time and wherein each preset period of time is divided into a series of rounds, wherein each round occurs at a fixed period of time defining a designated data collection window;

assign each panel a question set wherein at least on question in said question set remains fixed over said preset period of time, wherein said at least one question has the format of a forward looking forecasts, asking about the conduct of others and with a moving time horizon;

in response to a login from a user, send a user interface data, wherein said interface data includes at least one question set with two response fields for each question in said question set, comprising a numerical forecast field and free text entry field;

during said designated data collection window, receive a user response to said question set in the form of an outcome forecast and comments in said free text entry fields, if provided by the user;

store a user tracking number;

store the user response;

in a first round:

compute whether a minimum user participation is achieved;

compute a consensus for each question of said question set based on forecast responses from users during said designated collection window;

compute user forecasts for said designated collection window that fall within preset numerical ranges from said computed consensus;

identify a user comment that corresponds to said computed forecast;

store a direction of influence of said user's forecast relative to the consensus when made;

in response to determining that a forecast-consensus delta exceeds a predetermined threshold, extract a catalyst issue from said identified user comment using linguistic analysis including thesaurus-based concept capture and related term expansion, wherein said catalyst issue is stored in association with said direction of influence of said user's forecast;

store said questions set information, catalyst issue and direction of influence; and populating a delay list, a positive influence list, or a negative influence list based on said stored catalyst issue and said associated direction of influence;

in rounds subsequent to said first round:

in response to said login from said user with said login credentials, send a user interface data that also includes said user's forecast from said previous round;

compute whether a minimum user participation is achieved;

compute a consensus for each question of said question set based on forecast responses from users during said designated collection window;

compute a relative rate of change between the current and previous round;

compute user forecasts for said designated collection window that fall within preset numerical ranges from said computed consensus;

identify a user comment that corresponds to said computed forecast;

store a direction of influence of said user's forecast relative to the consensus when made;

in response to determining that a forecast-consensus delta exceeds a predetermined threshold, extract a catalyst issue from said identified user comment using linguistic analysis including thesaurus-based concept capture and related term expansion, wherein said catalyst issue is stored in association with said direction of influence of said user's forecast;

store said questions set information, catalyst issue, and direction of influence; and populating a delay list, a positive influence list, or a negative influence list based on said stored catalyst issue and said associated direction of influence;

store any one of said delay list, said positive influence list, and said negative influence list based on said stored questions set information, catalyst issue, and direction of influence of said rounds subsequent to said first round;

receive a social media post that would otherwise appear in social media but has not yet appeared;

extract terms that appear in said social media post using linguistic analysis including thesaurus-based concept capture and related term expansion; and perform social media manipulation detection or social media threat detection by determining whether any of the extracted terms appear on the delay list, the positive influence list, and the negative influence list; and perform social media manipulation countering or social media threat countering by:

buffering the social media post for delayed broadcasting based on a result of the determining of whether any of the extracted terms appear on said delay list;

controlling amplification amplifying the social media post based on the determining of whether any of the extracted terms appear on said positive influence list; and controlling de-amplification of the social media post based on the determining of whether any of the extracted terms appear on said negative influence list.

2. The method as claimed in claim 1, wherein the instructions further cause the one or more processors to: in a subsequent round among the subsequent rounds, assign approximately half of the panel to a control group and assigning a remainder of the panel to a test group, wherein, for said test group said interface data additionally comprises other user comment data or news data; and compute an implicit delta of the test group, wherein the implicit delta is a difference between the question consensus in the current round and the question consensus in the previous round in the test group compared to the difference between the question consensus in the current round and the question consensus in the previous round in the control group.

3. The method as claimed in claim 1 further comprising the steps of: generating one or more random numbers associated with a question; in response to a request for a random number sending at least one random number to a user; wherein said user's response comprises a user tracking number associated with at least one requested random number; and wherein said user response is stored under said tracking number.

4. The method as claimed in claim 1, wherein, in said rounds subsequent to said first round, the computing of the consensus for each question of said question set comprises removing user forecasts of users from said subsequent round consensus who did not have a forecast recorded in the previous round consensus.

5. The method as claimed in claim 1, wherein the controlling of the release of the social media post comprises: in response to the result of the determining of whether any of the extracted terms appear on said delay list being that at least one of the extracted terms appears on said delay list, releasing the social media post for consumption if the appearance of the at least one of the extracted terms on said delay list is a first occurrence of the least one of the extracted terms, and marking the social media post for delay if the appearance of the at least one of the extracted terms on said delay list is not the first occurrence of the at least one of the extracted terms.

6. The method as claimed in claim 5, wherein a delay associated with social media being marked for delay is computed based on a historic usage frequency of said at least one of the extracted terms, whereby the social media post is not delayed if a number of uses of said at least one of the extracted terms is below the historic usage frequency of said at least one of the extracted terms.

7. The method as claimed in claim 1, wherein the controlling of the amplifying of the social media post comprises: in response to the result of the determining of whether any of the extracted terms appear on said positive influence list being that at least one of the extracted terms appears on said positive influence list, amplifying said social media post.

8. The method as claimed in claim 1, the controlling of the de-amplifying of the social media post comprises: in response to the result of the determining of whether any of the extracted terms appear on said negative influence list being that at least one of the extracted terms appears on said negative influence list, de-amplifying said social media post.

9. A data storage system for media manipulation detection or media threat detection, comprising:

one or more processors;

a data store;

wherein said data storage system comprises a user login module that, in response to a login, retrieves for the user a question set and sends a user interface data, wherein said interface data includes at least one question set;

wherein said data storage system further comprises a question module that:

receives a user response to said question in the form of an outcome forecast and comments;

in a first round:

stores whether a minimum user participation is achieved;

stores a consensus for each question of said question set based on forecast responses from users during said designated collection window;

stores user forecasts for said designated collection window that fall within preset numerical ranges from said computed consensus;

stores a user comment that corresponds to said computed forecast;

stores a direction of influence of said user's forecast relative to the consensus when made;

in response to determining that a forecast-consensus delta exceeds a predetermined threshold, extracts a catalyst issue from said identified user comment extracted using linguistic analysis including thesaurus-based concept capture and related term expansion, wherein said catalyst issue is stored in association with said direction of influence of said user's forecast;

stores said questions set information, catalyst issue, and direction of influence; and populates a delay list, a positive influence list, or a negative influence list based on said stored catalyst issue and said associated direction of influence;

in rounds subsequent to said first round:

stores whether a minimum user participation is achieved;

stores a consensus for each question of said question set based on forecast responses from users during said designated collection window;

stores a relative rate of change between the current and previous round;

stores user forecasts for said designated collection window that fall within preset numerical ranges from said computed consensus;

stores a user comment that corresponds to said computed forecast;

stores a direction of influence of said user's forecast relative to the consensus when made;

in response to determining that a forecast-consensus delta exceeds a predetermined threshold, extracts a catalyst issue from said identified user comment using linguistic analysis including thesaurus-based concept capture and related term expansion, wherein said catalyst issue is stored in association with said direction of influence of said user's forecast;

stores said questions set information, catalyst issue, and direction of influence; and populates a delay list, a positive influence list, or a negative influence list based on said stored catalyst issue and said associated direction of influence;

wherein said data storage system:

stores any one of a delay list, a positive influence list, and a negative influence list based on said stored questions set information, catalyst issue, and direction of influence of said rounds subsequent to said first round;

receives a social media post that would otherwise appear in social media but has not yet appeared;

extracts terms that appear in said social media post using linguistic analysis including thesaurus-based concept capture and related term expansion;

performs social media manipulation detection or social media threat detection by determining whether any of the extracted terms appear on the delay list, the positive influence list, and the negative influence list; and performs social media manipulation countering or social media threat countering by:

buffering the social media post for delayed broadcasting based on a result of the determining of whether any of the extracted terms appear on said delay list;

controlling amplification of the social media post based on the determining of whether any of the extracted terms appear on said positive influence list; and controlling de-amplification of the social media post based on the determining of whether any of the extracted terms appear on said negative influence list.

10. The data storage system as claimed in claim 9, wherein: said interface data additionally comprises consensus data, other user comment data, or news data; in a subsequent round, said question module stores approximately half of the panel in a control group and stores a remainder of the panel is stored to a test group, wherein, for said test group said interface data additionally comprises other user comment data or news data; and said question module stores an implicit delta of the test group, where in the implicit delta is a difference between the question consensus in the current round and the question consensus in the previous round in the test group compared to the difference between the question consensus in the current round and the question consensus in the previous round in the control group.

11. The data storage system as claimed in claim 9, further comprising a catalysts testing module that: extracts said catalyst issue from said identified user comment; extracts geographical information related to said question; requests use of said catalyst issue in an on-line source associated with said geographic information; identifies at least one isolated spike in use of catalyst information in said on-line source; calculates a consensus for said question and monitoring monitors said consensus for a set number of days following said at least one isolated spike; and determines if said calculated consensus moves in said direction of influence and if so, records the catalyst as a positive for influence.

12. The data storage system as claimed in claim 9, wherein the controlling of the release of the social media post comprises: in response to the result of the determining of whether any of the extracted terms appear on said delay list being that at least one of the extracted terms appears on said delay list, releasing the social media post for consumption if the appearance of the at least one of the extracted terms on said delay list is a first occurrence of the least one of the extracted terms, and marking the social media post for delay if the appearance of the at least one of the extracted terms on said delay list is not the first occurrence of the at least one of the extracted terms.

13. The data storage system as claimed in claim 12, wherein a delay associated with social media being marked for delay is computed based on a historic usage frequency of said at least one of the extracted terms, whereby the social media post is not delayed if a number of uses of said at least one of the extracted terms is below the historic usage frequency of said at least one of the extracted terms.

14. The data storage system as claimed in claim 9, wherein the controlling of the amplifying of the social media post comprises: in response to the result of the determining of whether any of the extracted terms appear on said positive influence list being that at least one of the extracted terms appears on said positive influence list, amplifying said social media post.

15. The data storage system as claimed in claim 9, wherein the controlling of the de-amplifying of the social media post comprises: in response to the result of the determining of whether any of the extracted terms appear on said negative influence list being that at least one of the extracted terms appears on said negative influence list, de-amplifying said social media post.

* * * * *